(12) United States Patent
Smith et al.

(10) Patent No.: US 12,297,951 B2
(45) Date of Patent: May 13, 2025

(54) TUBULAR STRUCTURE REINFORCING

(71) Applicant: Keystone Tower Systems, Inc., Denver, CO (US)

(72) Inventors: Eric D. Smith, Denver, CO (US); Loren Daniel Bridgers, Golden, CO (US); Rosalind K. Takata, Denver, CO (US)

(73) Assignee: Keystone Tower Systems, Inc., Denver, CO (US)

( * ) Notice: Subject to any disclaimer, the term of this patent is extended or adjusted under 35 U.S.C. 154(b) by 689 days.

(21) Appl. No.: 17/161,265

(22) Filed: Jan. 28, 2021

(65) Prior Publication Data

US 2021/0231237 A1    Jul. 29, 2021

Related U.S. Application Data

(60) Provisional application No. 62/966,803, filed on Jan. 28, 2020.

(51) Int. Cl.
*F16L 9/14* (2006.01)
*B21B 1/22* (2006.01)
(Continued)

(52) U.S. Cl.
CPC ............. *F16L 9/14* (2013.01); *B21B 1/224* (2013.01); *B21B 1/28* (2013.01); *B21B 23/00* (2013.01);
(Continued)

(58) Field of Classification Search
CPC ....................................... F16L 9/14; F16L 9/16
(Continued)

(56) References Cited

U.S. PATENT DOCUMENTS 1,638,515 A * 8/1927 Walker .................... E04H 12/08
                                                                138/177
3,234,970 A * 2/1966 Baker ....................... F16L 9/16
                                                                138/144
(Continued)

FOREIGN PATENT DOCUMENTS

CN         101346197 A      1/2009
CN         201475627 U      5/2010
(Continued)

OTHER PUBLICATIONS

The International Bureau of WIPO, "International Preliminary Report on Patentability" issued in related International Patent Application No. PCT/US2021/015522 dated Aug. 11, 2022 (15 pages).
(Continued)

*Primary Examiner* — David R Deal
(74) *Attorney, Agent, or Firm* — The Marbury Law Group, PLLC

(57) ABSTRACT

According to one aspect, a tubular structure may include a base and a wrap. The base may have a first surface and second surface opposite one another, the first surface defining an elongate cavity, and the base having a tubular shape defining a longitudinal axis extending along the elongate cavity. The wrap may be supported on the second surface of the base, the wrap including a plurality of layers, and each layer having a first longitudinal edge and a second longitudinal edge coupled to one another along a respective spiral seam associated with the given layer and extending about the longitudinal axis of the base.

14 Claims, 13 Drawing Sheets

(51) Int. Cl.
  *B21B 1/28*    (2006.01)
  *B21B 23/00*   (2006.01)
  *B21B 27/02*   (2006.01)
  *B21B 31/00*   (2006.01)
  *B21B 39/34*   (2006.01)
  *F16L 9/16*    (2006.01)
  *B21B 15/00*   (2006.01)

(52) U.S. Cl.
  CPC ............ *B21B 27/021* (2013.01); *B21B 31/00* (2013.01); *B21B 39/34* (2013.01); *F16L 9/16* (2013.01); *B21B 2015/0092* (2013.01); *B21B 2205/04* (2013.01)

(58) Field of Classification Search
  USPC ........................................ 138/142, 144, 154
  See application file for complete search history.

(56) References Cited

U.S. PATENT DOCUMENTS

| | | | |
|---|---|---|---|
| 3,240,042 A | 3/1966 | Habdas | |
| 3,584,657 A * | 6/1971 | Dorr | F16L 41/084 138/143 |
| 3,587,658 A * | 6/1971 | Gutner | F16L 9/165 428/34.1 |
| 3,775,835 A | 12/1973 | Cauffiel | |
| 3,776,010 A | 12/1973 | Krakow | |
| 3,845,645 A | 11/1974 | Gerbauer | |
| 3,888,283 A | 6/1975 | Cauffiel | |
| 3,997,097 A | 12/1976 | Embury | |
| 4,082,211 A | 4/1978 | Embury | |
| 4,429,654 A | 2/1984 | Smith, Sr. | |
| 4,640,453 A | 2/1987 | Oe et al. | |
| 4,688,319 A * | 8/1987 | Gross | B21D 39/04 29/523 |
| 4,746,049 A * | 5/1988 | Oe | B21C 37/123 228/17.7 |
| 4,838,317 A | 6/1989 | Andre et al. | |
| 4,862,924 A * | 9/1989 | Kanao | F16L 11/16 138/144 |
| 5,131,325 A * | 7/1992 | Blauvelt | B41C 1/182 492/44 |
| 5,326,410 A | 7/1994 | Boyles | |
| 5,837,083 A * | 11/1998 | Booth | F16L 9/165 156/190 |
| 9,302,303 B2 | 4/2016 | Smith et al. | |
| 10,493,509 B2 | 12/2019 | Smith et al. | |
| 10,717,122 B2 | 7/2020 | Caron | |
| 2006/0112558 A1 | 6/2006 | Lorenz et al. | |
| 2010/0095508 A1 | 4/2010 | Wahlen et al. | |
| 2011/0138729 A1 | 6/2011 | Shiraishi | |
| 2012/0273556 A1 | 11/2012 | Unan | |
| 2013/0074564 A1 | 3/2013 | Smith et al. | |
| 2014/0047696 A1 | 2/2014 | Unan | |
| 2016/0375476 A1 | 12/2016 | Smith et al. | |
| 2018/0056354 A1 | 3/2018 | Takata et al. | |
| 2018/0193893 A1 | 7/2018 | Caron | |
| 2019/0063101 A1 | 2/2019 | Smith et al. | |

FOREIGN PATENT DOCUMENTS

| | | |
|---|---|---|
| EP | 0960986 A2 | 12/1999 |
| EP | 4073332 A1 | 10/2022 |
| GB | 2433453 A | 6/2007 |
| JP | S48-78066 A | 10/1973 |
| JP | S61-92783 A | 5/1986 |
| JP | S61-135418 A | 6/1986 |
| JP | S62-77117 A | 4/1987 |
| JP | 2014527914 A | 10/2014 |

OTHER PUBLICATIONS

PCT, International Searching Authority; International Search Report and Written Opinion; International Application No. PCT/US2021/015522, mailed Jun. 20, 2021, 25 pages.

Japanese Patent Office, "Notification of Reason for Rejection," issued in related Japanese Patent Application No. 2022-545,783, dated Apr. 16, 2024, including English Language translation (7 pages).

China National Intellectual Property Administration "First Office Action," issued in related Chinese Patent Application No. 202180011596.3, dated Mar. 29, 2024, including English Language translation (20 pages).

European Patent Office, "Intention to Grant", issued in related European Patent Application No. 21707528.2-1005, dated Apr. 2, 2024 (9 pages).

IP Australia, "Examination Report No. 1," issued in related Australian Patent Application No. 2021212171, dated Aug. 5, 2023 (4 pages).

Intellectual Property India, "First Examination Report," issued in related Indian Patent Application No. 202247047608 mailed Dec. 6, 2022 (7 pages).

Japanese Patent Office, "Notification of Reason for Rejection," issued in related Japanese Patent Application No. 2022-545,783 mailed Jul. 25, 2023 (26 pages).

Korean Intellectual Property Office, "Request for the Submission of an Opinion," issued in related Korean Patent Application No. 10-2022-7029454, dated Feb. 29, 2024, including English Language translation (7 pages).

Intellectual Property India, "Examination Report," issued in related Indian Patent Application No. 202247047608 mailed Dec. 6, 2022 (7 pages).

IP Australia, "Examination Report No. 2," issued in related Australian Patent Application No. 2021212171 dated Jun. 5, 2024 (3 pages).

National Intellectual Property Administration, P.R. China, "Notification to Grant Patent Right for Invention," issued in related Chinese Patent Application No. 202180011596.3 dated Nov. 4, 2024, incl. English Translation (4 pages).

European Patent Office, "Decision to Grant," issued in related European Patent Application No. 21707528.2 dated Aug. 16, 2024 (2 pages).

* cited by examiner

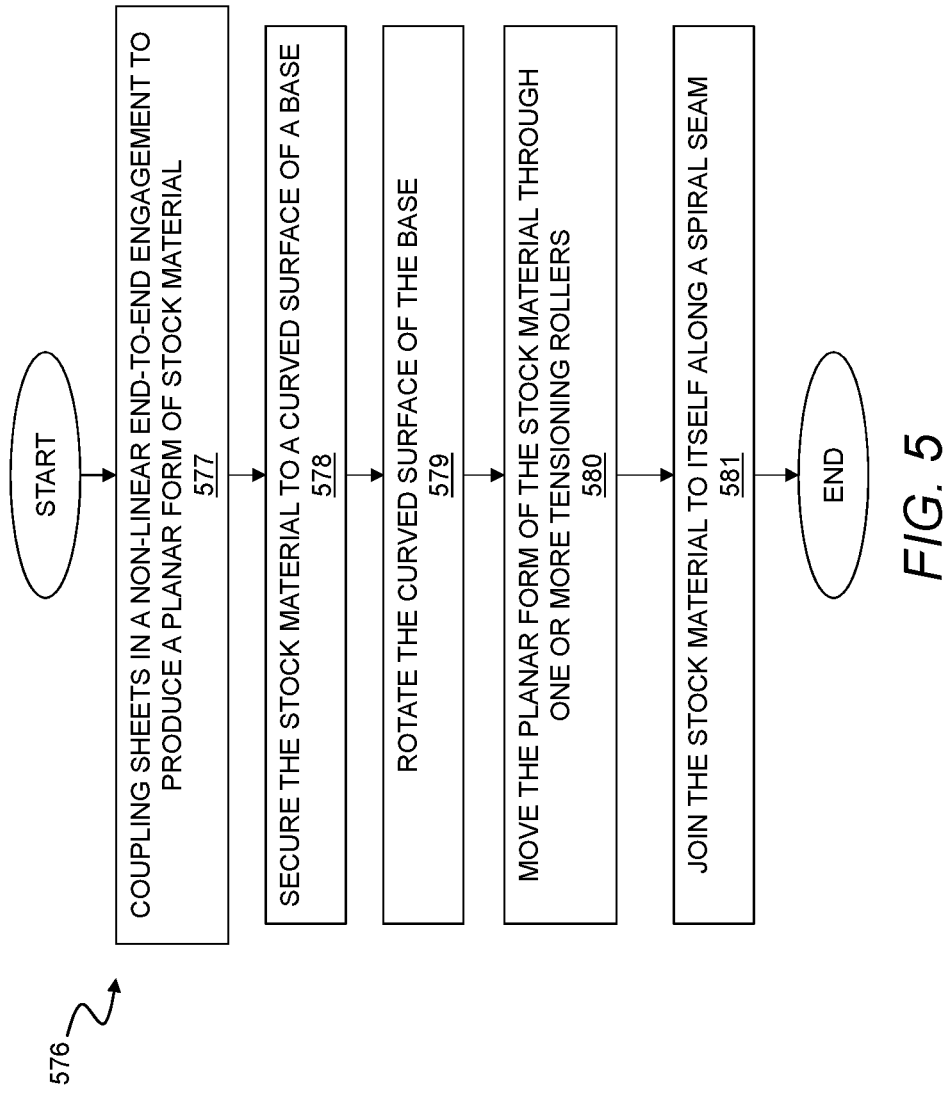

TUBULAR STRUCTURE REINFORCING

CROSS-REFERENCE TO RELATED APPLICATIONS

This application claims the benefit of U.S. Provisional Patent Application No. 62/966,803, filed on Jan. 28, 2020, the entire contents of which are incorporated herein by reference.

BACKGROUND

Many applications for large-scale support structures have thick, tubular walls. For example, off-shore wind turbines require large, thick-walled support towers and pilings because such wind turbines are large in size and experience high loading. Processes for producing these support structures are expensive and time-consuming, requiring rolling and welding of thick steel plate (e.g., 30 mm-100 mm). Rolling plate of such thickness requires the use of expensive specialty equipment to produce high forces. Also, welding thick plate requires a large number of weld passes, making the process lengthy and, therefore, adding to the cost of fabrication.

Accordingly, there is a need for forming support structures capable of withstanding high loading while being amenable to rapid and cost-effective fabrication.

SUMMARY

Tubular structures, systems, and methods are generally directed to support structures having structural properties similar to thick-walled structures while being formed using materials having thickness amendable to rolling and welding and, thus, useful for rapid and cost-effective fabrication.

According to one aspect, a tubular structure may include a base having a first surface and a second surface opposite one another, the first surface defining an elongate cavity, and the base having a tubular shape defining a longitudinal axis extending along the elongate cavity, and a wrap supported on the second surface of the base, the wrap including at least one layer, and each layer having a first longitudinal edge and a second longitudinal edge coupled to one another along a respective spiral seam associated with the given layer and extending about the longitudinal axis of the base.

In some implementations, a collective thickness of the wrap and the base may vary in a direction parallel to the longitudinal axis of the base. For example, a thickness of the wrap varies in a direction parallel to the longitudinal axis of the base. Additionally, or alternatively, a thickness of the base is substantially constant in a direction parallel to the longitudinal axis of the base. Further, or instead, the thickness of the wrap may vary monotonically in a direction parallel to the longitudinal axis of the base. As an example, the tubular shape of the base may include a frustocone tapered in a direction parallel to the longitudinal axis and the thickness of the wrap decreases monotonically in a direction of a taper of the frustocone.

In certain implementations, the at least one layer may be a plurality of layers, and the plurality of layers are at least partially stacked on one another in a radial direction. For example, each layer of the plurality of layers may circumscribe the base at least once. Additionally, or alternatively, a number of layers of the plurality of layers may vary in a direction parallel to the longitudinal axis of the base. Further, or instead, each layer of the plurality of layers may be joined to the base, to at least one other layer of the plurality of layers, or to a combination thereof. Still further, or instead, each layer of the plurality of layers may be welded to the base, to another layer of the plurality of layers, or a combination thereof. In some cases, the respective spiral seam of a given layer may be longitudinally offset from the respective spiral seam of each layer adjacent to the given layer.

In some implementations, the base may include a seam extending about the longitudinal axis of the base. For example, the respective spiral seam of the at least one layer of the wrap may be longitudinally spaced from the seam of the base along the longitudinal axis. Additionally, or alternatively, the seam of the base may be parallel to the respective spiral seam of the at least one layer of the wrap.

According to another aspect, a system for forming a tubular structure may include a drive system including drive rolls actuatable to move a planar form of stock material in a feed direction, a curving device positioned to receive the planar form of the stock material moving in the feed direction, the curving device controllable to bend the planar form of the stock material to produce a curved form of the stock material, a plurality of support rollers operable to rotatably support a curved surface of a material, and one or more pressure rolls positioned to receive the curved form of the stock material from the curving device, and the one or more pressure rolls movable to press the curved form of the stock material from the curving device onto the curved surface of the material rotatably supported on the plurality of support rollers. In some implementations, the system may further include a joiner positioned to join the curved form of the stock material to itself, to the curved surface rotatably supported on the plurality of support rollers, or to a combination thereof. Additionally, or alternatively, the system may further include a guidance system positioned to receive the curved form of the stock material from the curving device, the guidance system including an actuator controllable to wind the curved form of the stock material along a respective spiral seam of a given layer of a tubular structure being formed. The actuator may include, for example, one or more edge guides, one or more edge rollers, one or more pinch rolls, or a combination thereof. In some instances, the guidance system may further include a sensor configured to sense a parameter indicative of a position of the curved form of the stock material along the respective spiral seam, wherein the actuator is in electrical communication with the sensor, and the actuator is adjustable based on a signal from the sensor to adjust a position of the curved form of the stock material along the respective spiral seam of the given layer of the tubular structure being formed.

According to another aspect, a method of forming a tubular structure may include bending a portion of a planar form of a strip of a stock material into a curved form of the stock material, wrapping the curved form of the stock material onto a curved surface of a base to form a spiral seam about a longitudinal axis defined by the base, and joining the curved form of the stock material at least to itself along the spiral seam.

In certain implementations, wrapping the curved form of the stock material onto the curved surface of the base may include pressing the curved form of the stock material onto the curved surface of the base.

In some implementations, joining the curved form of the stock material at least to itself along the spiral seam may include joining the curved form of the stock material to the curved surface of the base.

In certain implementations, joining the curved form of the stock material at least to itself may include welding the curved form of the stock material to itself along the spiral seam.

According to another aspect, a system for forming a tubular structure may include a tensioning roller positionable in contact with a planar form of a stock material as the planar form of the stock material moves in a feed direction, a rotator actuatable to rotate a curved surface of a base about a longitudinal axis defined by the base, a guidance system including an actuator controllable to wind the planar form of the stock material along a spiral seam about the longitudinal axis of the base, and a joiner positioned to join the stock material at least to itself along the spiral seam as the tubular structure is being formed.

In some implementations, the actuator may include one or more edge guides, one or more edge rollers, one or more pinch rolls, or a combination thereof.

In certain implementations, the guidance system may further include a sensor configured to sense a parameter indicative of a position of the stock material along the spiral seam, wherein the actuator is in electrical communication with the sensor, and the actuator is adjustable based on a signal from the sensor to adjust a position of the planar form of the stock material along the spiral seam as the tubular structure is being formed.

According to yet another aspect, a method of forming a tubular structure may include coupling a plurality of sheets in a nonlinear end-to-end engagement with one another to produce a planar form of a stock material, securing the stock material to a curved surface of a base defining a longitudinal axis, and with the stock material secured to the base, rotating the curved surface of the base about the longitudinal axis of the base, the rotation of the curved surface of the base curving the planar form of the stock material about the curved surface of the base with a first longitudinal edge and a second longitudinal edge of the stock material forming at least one spiral seam about the longitudinal axis of the base. In some implementations, the method may further include, with the stock material secured to the base and the curved surface of the base rotating about the longitudinal axis, moving the planar form of the stock material through one or more tensioning rollers. Additionally, or alternatively, the method may further include joining the stock material to itself at least along the at least one spiral seam. In some instances, joining the stock material to itself at least along the at least one spiral seam may further include joining a layer of the stock material to the curved surface of the base, to a previous layer of the stock material, or a combination thereof.

According to still another aspect, a tubular structure may include a first shell, a second shell having a frustoconical shape, the first shell nested within the second shell with the first shell and the second shell defining a gap therebetween, and a stabilizer disposed in the gap, the stabilizer maintaining a position of the first shell and the second shell relative to one another.

In some implementations, the first shell may be substantially parallel to the second shell along a longitudinal axis defined by the first shell.

In certain implementations, the stabilizer may include a filler material bonded to the first shell, the second shell, or a combination thereof.

In some implementations, the stabilizer may include a plurality of structural elements extending through the gap and coupled to each of the first shell and the second shell. For example, the first shell may define a plurality of first holes, the second shell may define a plurality of second holes aligned with the plurality of first holes, and each one of the plurality of structural elements may extend though one of the plurality of the first holes and a corresponding one of the plurality of the second holes.

According to still another aspect, a tubular structure may include a shell having a first surface and a second surface, the first surface defining an elongate cavity, the first surface opposite the second surface, the shell having a tubular shape defining a longitudinal axis extending along the elongate cavity, and the shell having a spiral seam extending about the longitudinal axis, and a plurality of elongate ribs coupled to the shell with a longitudinal dimension of each elongate rib substantially parallel to the longitudinal axis defined by the tubular shape of the shell.

In some implementations, the tubular shape of the shell may be frustoconical.

In certain implementations, at least one of the plurality of elongate ribs may be secured along the first surface of the shell.

In some implementations, at least one of the plurality of elongate ribs may be secured along the second surface of the shell.

In certain implementations, the plurality of elongate ribs may be coupled to one another along a plurality of longitudinal seams substantially coplanar the longitudinal axis defined by the tubular shape of the shell.

In some implementations, each one of the plurality of elongate ribs may be V-shaped with a first leg and a second leg coupled to one another at an apex, and the first leg and the second leg are coupled to the shell.

BRIEF DESCRIPTION OF THE FIGURES

FIG. 5 is a flow chart of an exemplary method of forming a tubular structure.

Like reference symbols in the various drawings indicate like elements

DESCRIPTION

Figure 1A:
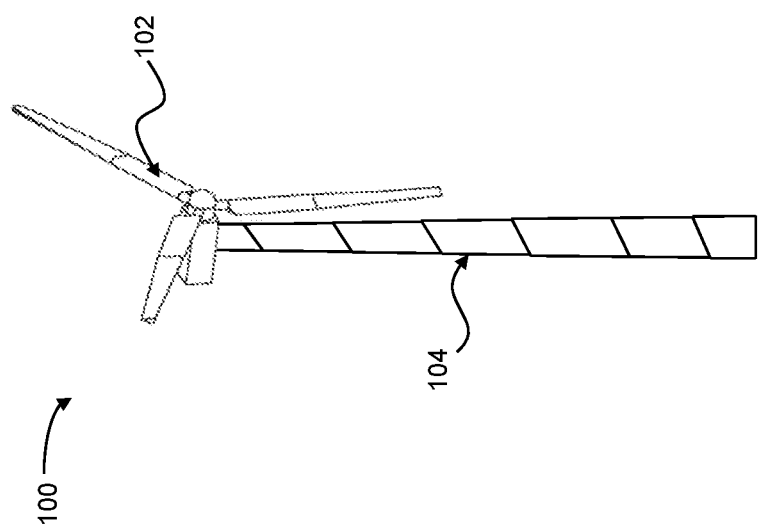
FIG. 1A is a perspective view of a wind turbine assembly including a tubular structure.
Figure 1B:
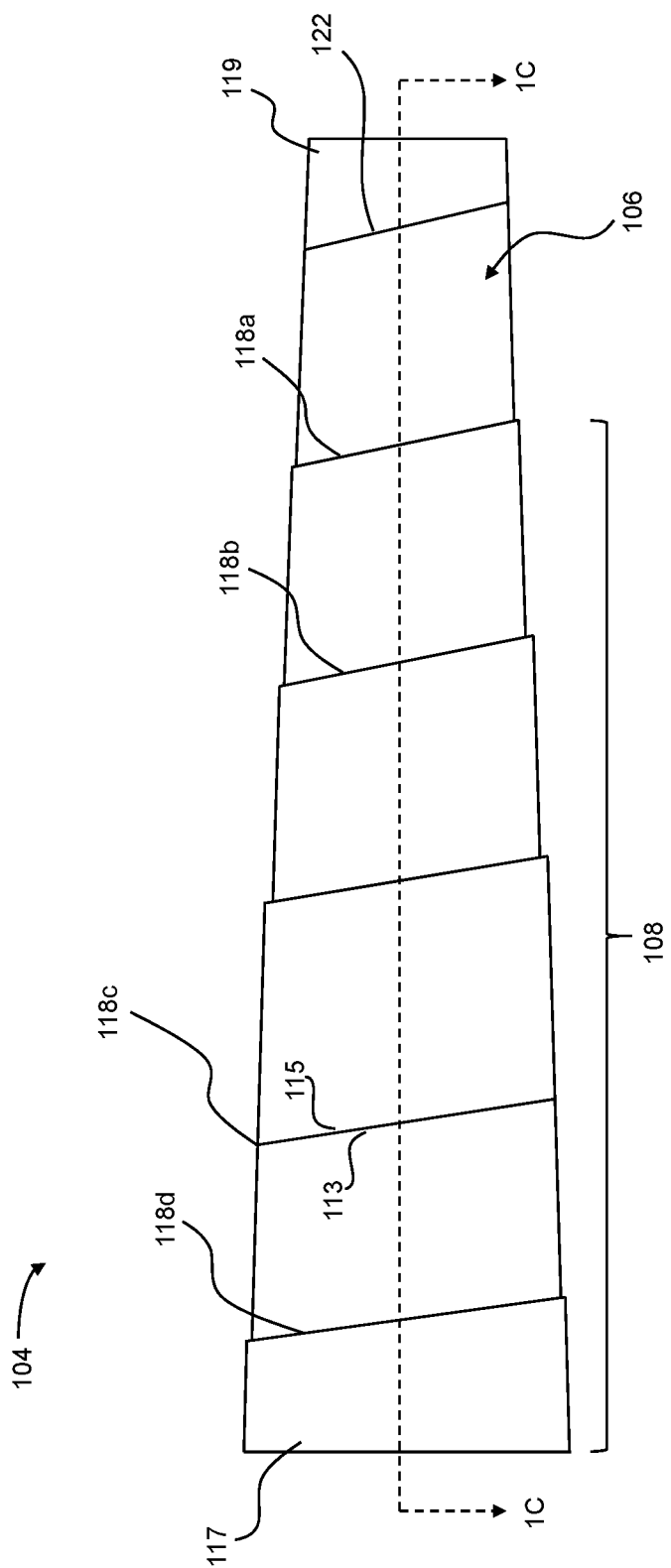
FIG. 1B is a side view of the tubular structure of FIG. 1A.

The embodiments will now be described more fully hereinafter with reference to the accompanying figures, in which exemplary embodiments are shown. The foregoing may, however, be embodied in many different forms and should not be construed as limited to the exemplary embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or," and the term "and" should generally be understood to mean "and/or."

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as including any deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) is intended merely to better illuminate the embodiments and does not pose a limitation on the scope of those embodiments. No language in the specification should be construed as indicating any unclaimed element as essential to the practice of the disclosed embodiments.

As used herein, the term "tubular structure" shall be understood to include any manner and form of structure defining an elongate cavity and having a substantially curvilinear two-dimensional profile about a longitudinal axis extending along the elongate cavity. Thus, unless otherwise specified or made clear from the context, some examples of tubular structures include frustocones and cylinders (e.g., right circular cylinders). Unless otherwise indicated, it shall be understood that tubular shapes described herein may include shapes approximating geometric ideals such as curvilinear, frustoconical, conical, or cylindrical. Such approximations of geometric ideals may include approximation of a frustocone using stacks of layers of material and/or deviations from a geometric ideal resulting from typical manufacturing tolerances.

Further, as used herein, the term "thickness" and variations thereof shall be understood to refer generally to a wall thickness of a given material and shall be understood in context. For example, with respect to a single layer, thickness shall be generally understood to refer to wall thickness of the single layer, unless otherwise specified or made clear from the context. Additionally, or alternatively, with respect to a plurality of layers, thickness shall be understood to refer to the overall thickness of the plurality of layers wrapped on top of one another, unless a contrary use is indicated. Further, or instead, with respect to tubular structures described herein, thickness shall be understood to refer to the overall thickness of the tubular structure at a given point along a longitudinal axis and, thus, may refer to a wall thickness of a base alone or to the combined thickness of a base supporting a wrap, as the case may be at the given point along the longitudinal axis.

Still further, as used herein, the terms "longitudinal" and "radial" shall be understood to refer to directions in a cylindrical coordinate system unless a contrary intent is clear from the context. Thus, in particular, references to a radial direction shall be understood to refer to a direction perpendicular to a longitudinal axis. Further, or instead, a longitudinal direction associated with such a cylindrical coordinate system shall be understood to be parallel to a longitudinal axis associated with the structure being described. While the longitudinal axis may correspond to a center axis of any given structure, it shall be appreciated that this does not necessarily have to be the case in certain implementations.

The devices, systems, and methods of the present disclosure are described in the context of tubular structures useful as towers for large wind turbines (e.g., off-shore wind turbines) capable of withstanding high loads. More specifically, in the interest of clear and efficient description, aspects of the present disclosure are generally described in the context of frustocones, but shall be understood to be equally applicable to cylinders unless a contrary intent is indicated. Further, for the sake of clear illustration, tubular structures are shown as unitary constructions. However, unless a contrary intent is indicated, any one or more of the various different frustocones described herein shall be understood to be manufacturable in sections according to the dimensional requirements of a given end-use. Still further, unless otherwise specified or made clear from the context, such tubular structures described herein may be used in any one or more of various different applications requiring high strength and/or high stiffness, such as tubular structures useful in pilings or other support structures for wind turbines or, more generally, for large civil structures, pipelines, pressure vessels, etc.

Referring now to FIGS. 1A-1D, a wind turbine assembly 100 may include a wind turbine 102 and a tubular structure 104. The wind turbine 102 may be supported by the tubular structure 104, with the tubular structure 104 withstanding loading conditions associated with movement of the wind turbine 102 and an installation environment. In certain instances, the tubular structure 104 may have a diameter decreasing along the length of the tubular structure 104 such that the top, where the wind turbine 102 is attached, has a smaller diameter than the bottom, where the tubular structure 104 is fixedly secured to the ground or other rigid surface. The longitudinally tapering diameter of the tubular structure 104 can be useful, for example, for addressing competing considerations of efficient use of material while providing structural strength to support the loads exerted on the tubular structure 104 in the field. However, the strength profiles achievable using longitudinal tapering may be subject to certain limits (e.g., dimensional constraints associated with transport and/or installation). Thus, as described in greater detail below, the thickness of material of the tubular structure 104 may be additionally, or alternatively, varied to facilitate achieving a predetermined strength profile of the tubular structure 104 while navigating practical considerations, such as installation time and cost.

The tubular structure 104 may include a base 106 and a wrap 108. The base 106 may have a first surface 110 and a second surface 112 opposite one another, with a distance between the first surface 110 and the second surface 112 defining a thickness of the base 106. The first surface 110 of the base 106 may define an elongate cavity 114, and the base 106 may have a tubular shape defining a longitudinal axis "L" extending along the elongate cavity 114. The wrap 108 may include a plurality of layers 116a,b,c,d (referred to collectively as the plurality of layers 116a,b,c,d and individually as a first layer 116a, a second layer 116b, a third layer 116c, and a fourth layer 116d) and the wrap 108 may be supported on the second surface 112 of the base 106. That is, as described in greater detail below, the first layer 116a may be supported on the second surface 112 of the base 106, the second layer 116b may be supported on the first layer 116a, the third layer 116c may be supported on the second layer 116b, and the fourth layer 116d may be supported on the third layer 116c. While the tubular structure 104 is described below as including the plurality of layers 116a,b,c,d, it shall be appreciated that this is for the sake of clear and efficient description of certain aspects associated with the wrap 108 including multiple layers. However, unless otherwise specified, any description associated with the plurality of layers 116a,b,c,d below shall be understood to be applicable to implementations including only a single instance of a layer and/or to implementations including more than four layers. Further, or instead, for the sake of clear and efficient description, each one of the plurality of layers 116a,b,c,d shall be understood to have the same nominal composition as one another and may have any one or more of varying different nominal thicknesses relative to one another, as may be useful for achieving a given thickness profile of the tubular structure 104 in a direction parallel to the longitudinal axis "L."

With the wrap 108 supported on the base 106, the tubular structure 104 may have strength similar to an otherwise identically dimensioned structure formed using a thick-walled material of the same material thickness as the combined material thickness of the plurality of layers 116a,b,c,d and the base 106. However, as compared to working with the thick-walled material to achieve a target thickness profile (e.g., strength profile) in a longitudinal direction, the wrap 108 supported on the base 106 offers significant advantages. For example, because each one of the plurality of layers 116a,b,c,d is individually thinner than the thick-walled material, each one of the plurality of layers 116a,b,c,d may be rolled, welded, or otherwise manipulated relatively easily as compared to the thick-walled material. That is, as compared to achieving a target overall thickness using the thick-walled material, achieving the target overall thickness using the wrap 108 positioned on the base 106 may reduce production time and/or production costs. Similarly, each one of the plurality of layers 116a,b,c,d may be sized to reduce or eliminate the need for specialty equipment that may otherwise be required for working with thick-walled material of comparable thickness to the plurality of layers 116a,b,c,d.

In general, the base 106 may be any one or more of various different tubular shapes useful for supporting the plurality of layers 116a,b,c,d such that the combined tubular structure 104 may have predetermined thickness profile in a direction parallel to the longitudinal axis "L." For example, the base 106 may include a frustocone, which itself has a strength profile that makes efficient use of material for supporting the wind turbine 102 and about which the wrap 108 may be positioned to reinforce the wider end of the frustocone-thus, adding to the strength difference achievable between the wide end of the frustocone and the narrow end of the frustocone of given dimensions. Stated differently, the wrap 108 supported on the base 106 may advantageously decouple certain design constraints (e.g., strength-to-size) associated with forming a support structure using only a single layer of material.

In certain implementations, the base 106 may have a substantially constant thickness (e.g., allowing for normal manufacturing tolerances associated with commercially available metal sheet stock) in a direction parallel to the longitudinal axis "L." Such a substantially constant thickness may be useful, for example, for forming the base 106 using any one or more of various different stock materials that may be readily and cost-effectively sourced. Additionally, or alternatively, forming the base 106 with a constant thickness may be useful for forming the base 106 quickly using any one or more of various different techniques and with little or no need for special equipment.

In general, the plurality of layers 116a,b,c,d of the wrap 108 may be dimensioned relative to one another and relative to the base 106 to achieve a predetermined thickness profile of the tubular structure 104 in a direction parallel to the longitudinal axis "L." Significantly, one or more of the plurality of layers 116a,b,c,d may extend along only a portion of a longitudinal dimension of the base 106 such that a thickness of the wrap 108 in the radial direction varies in a direction parallel to the longitudinal axis "L" to facilitate varying a thickness profile of the tubular structure 104 in a direction parallel to the longitudinal axis "L." For example, the number of the plurality of layers 116a,b,c,d may decrease in a direction parallel to the longitudinal axis "L" such that the wrap 108 has a monotonically decreasing thickness in the direction parallel to the longitudinal axis "L." That is, according to this example, the tubular structure 104 may have a first overall thickness t1 along a first end portion 117 and a second overall thickness t2 along a second end portion 119, with the first overall thickness t1 greater than the second overall thickness t2. While one or more of the plurality of layers 116a,b,c,d may have a constant wall thickness in a direction parallel to the axis "L," it shall be appreciated that one or more of the plurality of layers 116a,b,c,d may have a wall thickness that varies at least along a portion of a longitudinal dimension of the given layer. Further, or instead, while each one of the plurality of layers 116a,b,c,d may have the same thickness profile as one another, it shall be appreciated that one or more of the plurality of layers 116a,b,c,d may have thickness profiles that differ from at least another one of the plurality of layers 116a,b,c,d. Thus, more generally, unless otherwise specified or made clear from the context, the plurality of layers 116a,b,c,d may have any one or more of various different thickness profiles in a direction parallel to the longitudinal axis "L," as may be necessary or useful to achieve an overall thickness profile of the wrap 108 in a direction parallel to the longitudinal axis "L."

Figure 1C:
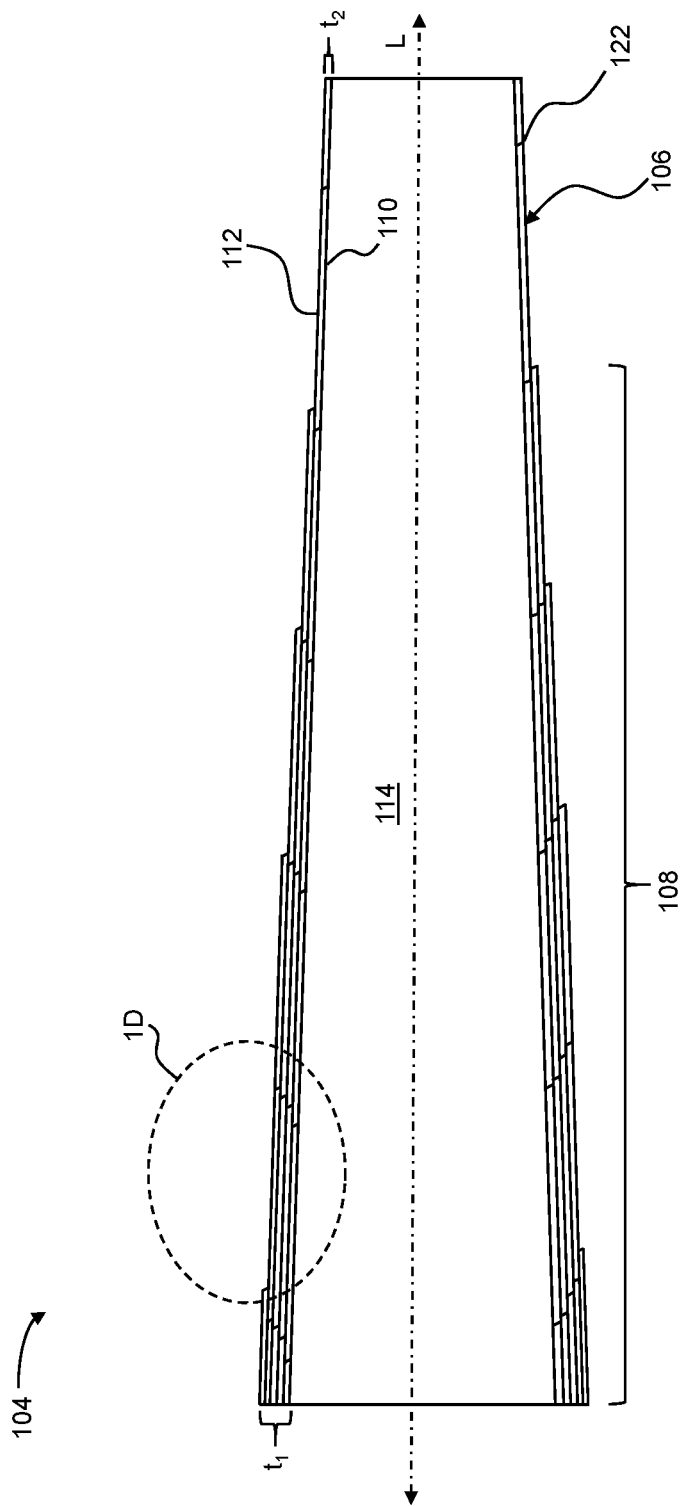
FIG. 1C is a cross-sectional side view of the tubular structure of FIG. 1A, with the cross-section taken along the line 1C-1C in FIG. 1B.

In the particular example shown in FIG. 1C, the plurality of layers 116a,b,c,d of the wrap 108 are supported on the base 106 with a wrapped configuration in which the plurality of layers 116a,b,c,d of the wrap are at least partially stacked on one another in the radial direction, resulting a thickness profile of the tubular structure 104 having five different thicknesses in a direction parallel to the longitudinal axis "L"—with the first thickness t1 along the first end portion 117 of the tubular structure 104 corresponding to the combined thickness of the base 106 and all of the plurality of layers 116a,b,c,d, while the second thickness t2 along the second end portion 119 of the tubular structure 104 corresponds to the wall thickness between the first surface 110 and the second surface 112 of the base 106.

Each one of the plurality of layers 116a,b,c,d may have a first longitudinal edge 113 and a second longitudinal edge 115 coupled to one another such that each one of the plurality of layers 116a,b,c,d circumscribes the base 106 at least once. For example, the first longitudinal edge 113 and the second longitudinal edge 115 of each one of the plurality of layers 116a,b,c,d may be coupled to one another along a respective plurality of spiral seams 118a,b,c,d (referred to collectively as the plurality of spiral seams 118a,b,c,d and individually as the first spiral seam 118a, the second spiral seam 118b, the third spiral seam 118c, and the fourth spiral seam 118d). That is, the first layer 116a may form the first spiral seam 118a, the second layer 116b may form the second spiral seam 118b, the third layer 116c may form the third spiral seam 118c, and the fourth layer 116d may form the fourth spiral seam 118d. Each one of the plurality of spiral seams 118a,b,c,d may extend about the longitudinal axis "L" of the base 106, such as may be useful for forming each one of the plurality of spiral seams 118a,b,c,d in a continuous or substantially continuous joining process as the base 106 is rotated about the longitudinal axis "L," according to any one or more of the various different techniques described herein.

In certain implementations, the plurality of layers 116a,b,c,d may be joined to the base 106 and/or to one another, as is useful for efficiently distributing external loads through the tubular structure 104. For example, the plurality of layers 116a,b,c,d may be joined to the base 106 and/or to one another with a plurality of welds 120a,b,c,d, e (collectively referred to as the plurality of welds 120a,b,c,d and individually referred to herein as the first weld 120a, the second weld 120b, the third weld 120c, the fourth weld 120d, and the fifth weld 120e). As used in this context, the term "weld" shall be understood to refer to a joint formed between at least two adjacent pieces of material.

For example, the first weld 120a may be a double-sided weld used to join the base 106 to itself along a seam 122 such that the base 106 may be a stable structure upon which the plurality of layers 116a,b,c,d of the wrap 108 may be positioned and to which the plurality of layers 116a,b,c,d may be directly or indirectly secured to form the tubular structure 104. In certain instances, the seam 122 of the base 106 may be a spiral seam, such as may be useful for producing the base 106 using any one or more of various different automated techniques, such as those described in U.S. Pat. No. 9,302,303, entitled "TAPERED STRUCTURE CONSTRUCTION," issued on Apr. 5, 2016, to Smith et al., the entire contents of which are hereby incorporated by reference. Additionally, or alternatively, the first weld 120a may be formed as part of a different process than the process used to secure the plurality of layers 116a,b,c,d to the base 106. Thus, while the first weld 120a may correspond to a spiral seam of the base 106, it shall be appreciated that such a spiral seam may not necessarily be used on the base 106, given that the base 106 may not be formed as part of a continuous or substantially continuous process in which spiral seams are useful. Additionally, or alternatively, the second weld 120b may penetrate into the base 106 as well as into the first spiral seam 118a formed by the first longitudinal edge 113 and the second longitudinal edge 115 of the first layer 116a such that the second weld 120b may be substantially coextensive with the first spiral seam 118a. Similarly, the third weld 120c may be coextensive along the second spiral seam 118b to join the first layer 116a and the second layer 116b to one another. In an analogous manner, the second layer 116b, the third layer 116c, and the fourth layer 116d may be joined to one another via the fourth weld 120d and the fifth weld 120e.

The first longitudinal edge 113 and the second longitudinal edge 115 of each one of the plurality of layers 116a,b,c,d may each include one or more features useful for facilitating alignment and/or coupling of these edges with respect to one another. For example, the first longitudinal edge 113 and the second longitudinal edge 115 may each include a single bevel such that, when aligned the first longitudinal edge 113 and the second longitudinal edge 115 of a given layer form a "V" shape into which a respective one of the second weld 120b, the third weld 120c, the fourth weld 120d, or the fifth weld 120e may be formed using a single-sided welding process. In the first layer 116a, such "V" edge preparation may, for example, facilitate joining the first longitudinal edge 113 and the second longitudinal edge 115 to one another and to the base 106 simultaneously, resulting a better weld quality. Similarly, for each one of the subsequent layers (the second layer 116b, the third layer 116c, and the fourth layer 116d), the "V" edge preparation may facilitate joining the first longitudinal edge 113 and the second longitudinal edge 115 to one another and to a preceding layer simultaneously, with a corresponding improvement in weld quality.

In some instances, the plurality of spiral seams 118a,b,c,d may be longitudinally offset from one another in a direction parallel to the longitudinal axis "L" of the base 106. With such an offset, the plurality of seams 118a,b,c,d do not line up on top of each other in a radial direction extending from the longitudinal axis "L." This type of spacing may facilitate distributing weld-induced stresses along the tubular structure 104, as the tubular structure 104 is being formed, thus facilitating control over quality of the tubular structure 104.

Figure 1D:
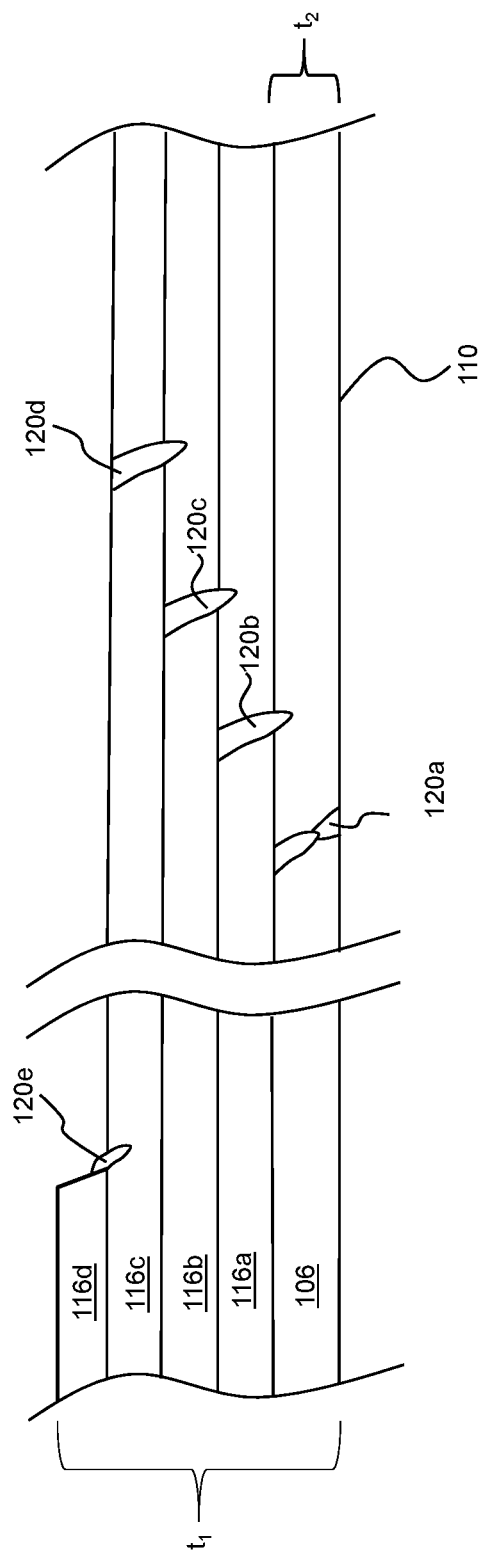
FIG. 1D is a close-up view of the tubular structure along the area of detail 1C in FIG. 1C.
Figure 2A:
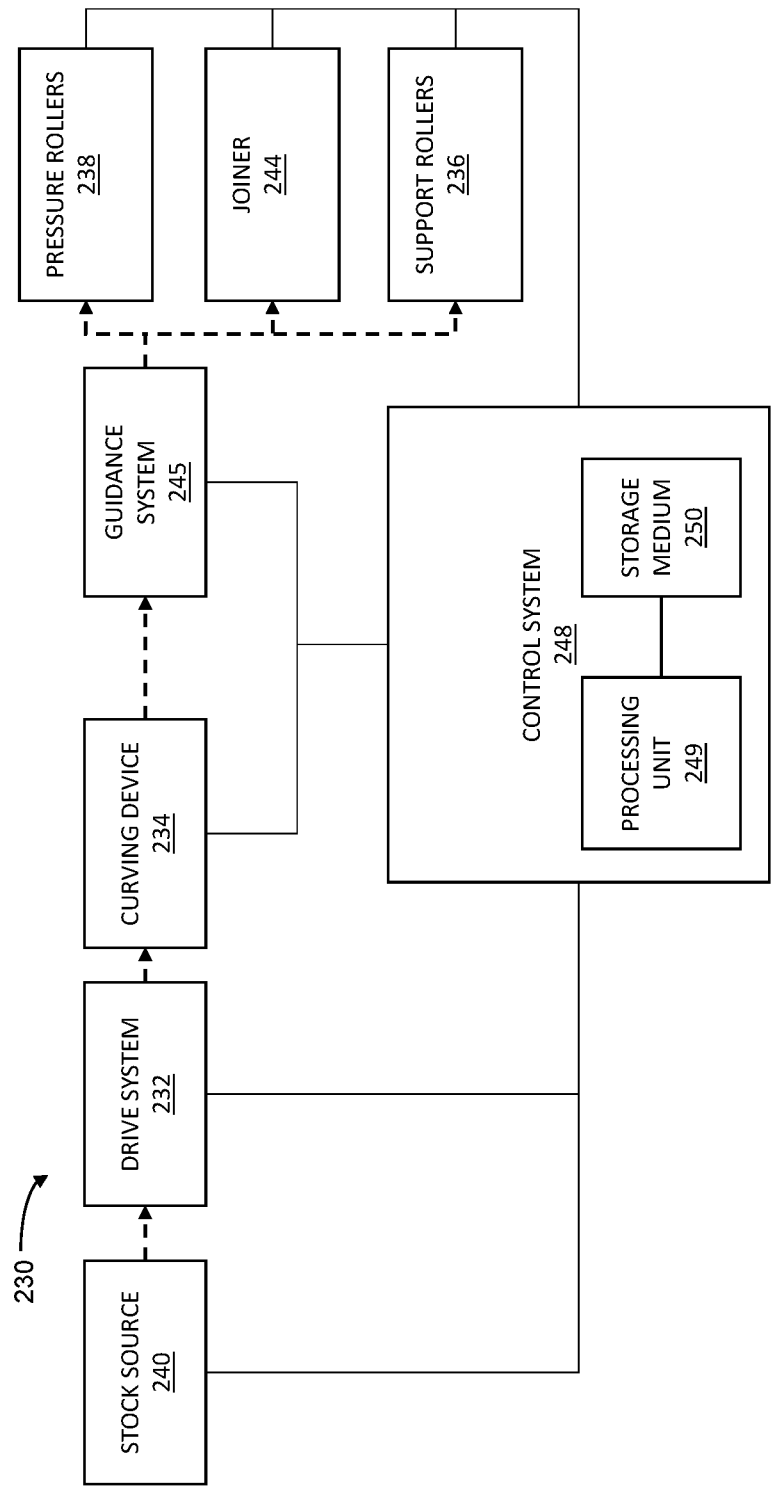
FIG. 2A is block diagram of a fabrication system for forming a tubular structure.
Figure 2B:
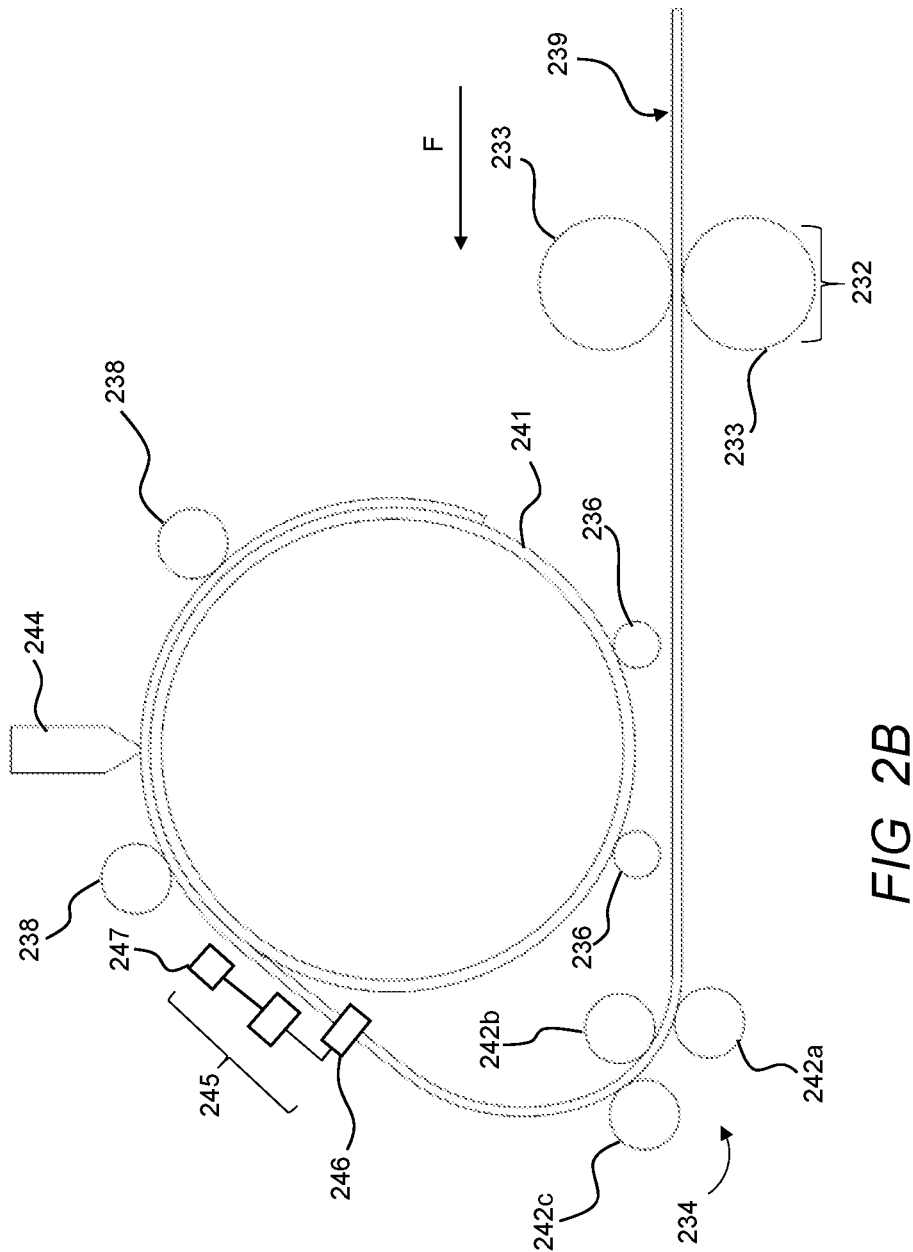
FIG. 2B is a schematic representation of a wrapping process carried out by the fabrication system of FIG. 2A.

Referring now to FIGS. 2A and 2B, a system 230 may include a drive system 232, a curving device 234, a plurality of support rollers 236, and one or more instances of a pressure roll 238. Unless otherwise specified or made clear from the context, the system 230 may be operable to form the tubular structure 104 (FIGS. 1A-1D). For example, the drive system 232 may be actuatable to move a planar form of stock material 239 (e.g., from a stock source 240) in a feed direction "F" and into the curving device 234, where the planar form of the stock material 239 may be pre-curved into a curved form of the stock material 239. The curved form of the stock material 239 may be moved between the one or more instances of the pressure roll 238 and a curved surface 241 of a material supported on the plurality of support rollers 236 to, ultimately, form the wrap 108 (FIGS. 1A-1D) of the tubular structure 104 (FIGS. 1A-1D). That is, depending on the stage of fabrication and the thickness profile of the tubular structure 104 (FIGS. 1A-1D) being formed using the system 230, the curved surface 241 receiving the curved form of the stock material 239 may be the second surface 112 of the base 106 (FIGS. 1A-1D) or a surface of a preceding layer of the wrap 108 (FIGS. 1A-1D). Pre-rolling the stock material 239 in the curving device 234 to form the curved form of the stock material 239 may increase the degree to which the stock material 239 conforms to the curved surface 241 (e.g., to the base 106 and/or to the previous one of the plurality of layers 116a,b,c,d in FIGS. 1A-1D) to increase strength, stiffness, and/or other desirable properties of the tubular structure (e.g., the tubular structure 104 in FIGS. 1A-1D) being formed.

In general, the drive system 232 may include drive rolls 233 actuatable to move the planar form of the stock material 239 in the feed direction "F." For example, the drive rolls 233 may pinch the planar form of the stock material such that rotation of the drive rolls 233 can move the planar form of the stock material 239 along the feed direction "F." In certain implementations, the feed direction "F" can be substantially constant (e.g., with the drive rolls 233 in a substantially stationary position as the rotation of the drive rolls 233 moves the planar form of the stock material 239 to and/or through the curving device 234). Additionally, or alternatively, the feed direction "F" can change such that the planar form of the stock material 239 undergoes rotational motion and/or substantially rotational motion as the planar form for the stock material 239 is moved to and through the curving device 234. Such changes in the feed direction "F" can be useful for aligning edges of the stock material 239 to form any one or more of the spiral seams described herein. Examples of such changes in the feed direction "F" to produce rotational and/or substantially rotational motion as part of the fabrication process of tubular structures are described in U.S. Pat. No. 9,302,303, entitled "TAPERED STRUCTURE CONSTRUCTION," issued to Smith et al. on Apr. 5, 2016, and U.S. Pat. No. 10,189,064, entitled "CONTROL SYSTEM AND METHOD FOR TAPERED STRUCTURE CONSTRUCTION," issued to Takata et al. on Jan. 29, 2019, the entire contents of each of which are incorporated herein by reference. More generally, any equipment suitable for moving planar material according to any of various different techniques known in the art can be used to move the planar form of the stock material 239 from the stock source 240 to, and in some instances through, the curving device 234. Such equipment can include, for example, robotic arms, pistons, servo motors, screws, actuators, rollers, drivers, electromagnets, or combinations thereof.

The curving device 234 may be positioned to receive the planar form of the stock material 239 moving in the feed direction "F," and the curving device 234 may bend the planar form of the stock material 239 fed into it to produce the curved form of the stock material 239. As an example, the curving device 234 may bend the planar form of the stock material 239 without imparting in-plane deformation to the stock material 239. Additionally, or alternatively, the curving device 234 may impart a controlled amount of curvature to the stock material 239 such that the stock material 239 in the curved form may approximately match curvature of the curved surface 241 onto which the curved form of the stock material 239 is moved.

The curving device 234 may, for example, include roll banks 242a, 242b, 242c positioned relative to one another and to the planar form of the stock material 239 to impart curvature to the planar form of the stock material 239 fed through the roll banks 242a, 242b, 242c. In certain instances, the roll banks 242a, 242b, 242c may be arranged as a triple-roll and, further or instead, the roll banks 242a, 242b, 242c may be movable relative to one another to vary a bending moment applied to the stock material 239 moving through the curving device 234. Each one of the roll banks 242a, 242b, 242c may include, for example, a plurality of individual rollers independently rotatable relative to one another and arranged along a respective axis defined by the respective one of the roll bank 242a, 242b, 242c. Further, or instead, the individual rollers of the roll banks 242a, 242b, 242c may be positionable relative to a respective axis defined by the one of the roll banks 242a, 242b, 242c (e.g., through an actuation signal received by a control system).

In general, the support rollers 236 may allow the curved surface 241 of the tubular structure being formed to rotate relative to the curved form of the stock material 239 moving from the curving device 234 onto the curved surface 241. In some implementations, one or more of the support rollers 236 may be actively controlled to rotate the curved surface 241 at a predetermined rate, such as may be useful for providing tension to the curved form of the stock material 239 to facilitate locating the curved form of the stock material 239 tightly onto the curved surface 241. In some instances, one or more of the support rollers 236 may be passive such that the force of the curved form of the stock material 239 moving onto the curved surface 241 may rotate the curved surface 241 as the tubular structure is being formed.

Each of the one or more instances of the pressure roll 238 may include one or more rollers movable to press the curved form of the stock material 239 onto the curved surface 241 rotatably supported on the plurality of support rollers 236. For example, at least one instance of the pressure roll 238 may be rotatable about an axis parallel to the curved surface 241 of the base 106 to move the curved form of the stock material 239 onto the curved surface 241 from the curving device 234. Additionally, or alternatively, at least one instance of the pressure roll 238 may be movable in a radial direction relative to the tubular structure being formed, with such radial movement of the at least one instance of the pressure roll 238 useful for controlling a degree of conformity between the curved form of the stock material 239 and the curved surface 241. Stated differently, radial movement of the at least one instance of the pressure roll 238 may reduce the likelihood of unintended gaps between layers of material of a wrap and/or between the wrap and a base, with the reduced likelihood of such gaps including improved load bearing performance.

In certain implementations, the system 230 may include a joiner 244 positioned or positionable to join (e.g., mechanically couple) the curved form of the stock material 239 to itself (e.g., along any one or more of the spiral seams described above with respect to FIGS. 1A-1D). Further, or instead, the joiner 244 may be positioned or positionable to join the curved form of the stock material 239 to the curved surface 241 rotatably supported on the plurality of support rollers 236. As an example, the joiner 244 may be positioned between two instances of the pressure roll 238 to increase the likelihood of a tight fit between the curved form of the stock material 239 to the curved surface 241 as a joining operation is carried out. In some instances, the joiner 244 may mechanically couple material together on a continuous basis as the curved form of the stock material 239 moves onto the curved surface 241 rotating on the support rollers 236. Such continuous mechanical coupling may be useful for, among other things, achieving target structural performance of the tubular structure being formed. Additionally, or alternatively, the joiner 244 may be operable to intermittently couple (e.g., at fixed distances) material along any one or more of the various different spiral seams described herein, with such intermittent coupling being useful for faster throughput.

The joiner 244 may include, for example, a welder operable to form any one or more of the various different welds described herein. A variety of techniques for welding are known in the art and may be adapted for joining any one or more edges together as contemplated herein. This may, for example, include any welding technique that melts a base metal or other material along any one or more of the various different seams described herein, optionally along with a filler added to the joint to improve strength of the bond. Conventional welding techniques suitable for structurally joining metal include, by way of example and not limitation: gas metal arc welding (GMAW), including inert gas (MIG) and/or metal active gas (MAG); submerged arc welding (SAW); laser welding; and gas tungsten arc welding (also known as tungsten, inert gas or "TIG" welding); and many others.

In certain implementations, the system 230 may include a guidance system 245 positioned to receive the curved form of the stock material 239 from the curving device 234. The guidance system 245 may include, for example, an actuator 246 controllable (e.g., in a direction substantially parallel to a longitudinal axis of the tubular structure being formed) to wind the curved form of the stock material 239 along a respective spiral seam of a given layer of a wrap being coupled to the base of the tubular structure being formed. Some examples of the actuator 246 include, but are not limited to, one or more edge guides, one or more edge rollers, one or more pinch rolls, or a combination thereof. In some cases, the guidance system 245 may further include a sensor 247 operable to sense a parameter indicative of a position of the curved form of the stock material 239 along the spiral seam being formed by the curved form of the stock material 239 moving onto the curved surface 241. Examples of the sensor 247 may include an optical sensor, one or more cameras of a machine vision system, a contact sensor, or a combination thereof. The actuator 246 may, for example, be adjustable based on a signal from the sensor 247 to implement a corresponding adjustment of a position of the curved form of the stock material 239 along the spiral seam being formed as the curved form of the stock material 239 moves onto the curved surface 241.

While one or more aspects of operation of the system 230 may be carried out through manual operation by an operator, the system 230 may include a control system 248 to facilitate accurate and repeatable control of certain aspects of operation of the system 230 in some implementations. The control system 248 may include, for example, a processing unit 249 and a storage medium 250 in communication with the processing unit 249. The processing unit 249 may include one or more processors, and the storage medium 250 may include a non-transitory, computer-readable storage medium. The storage medium 250 may store computer-executable instructions that, when executed by the processing unit 249, cause the system 230 to perform one or more of the various different aspects of fabrication of a tubular structure using the system 230. Optionally, the control system 248 may include an input device (e.g., a keyboard, a mouse, and/or a graphical user interface) in communication with the processing unit 249 and the storage medium 250 such that the processing unit 249 is additionally, or alternatively, responsive to input received through the input device as the processing unit 249 executes one or more of the fabrication methods described herein.

Figure 3:
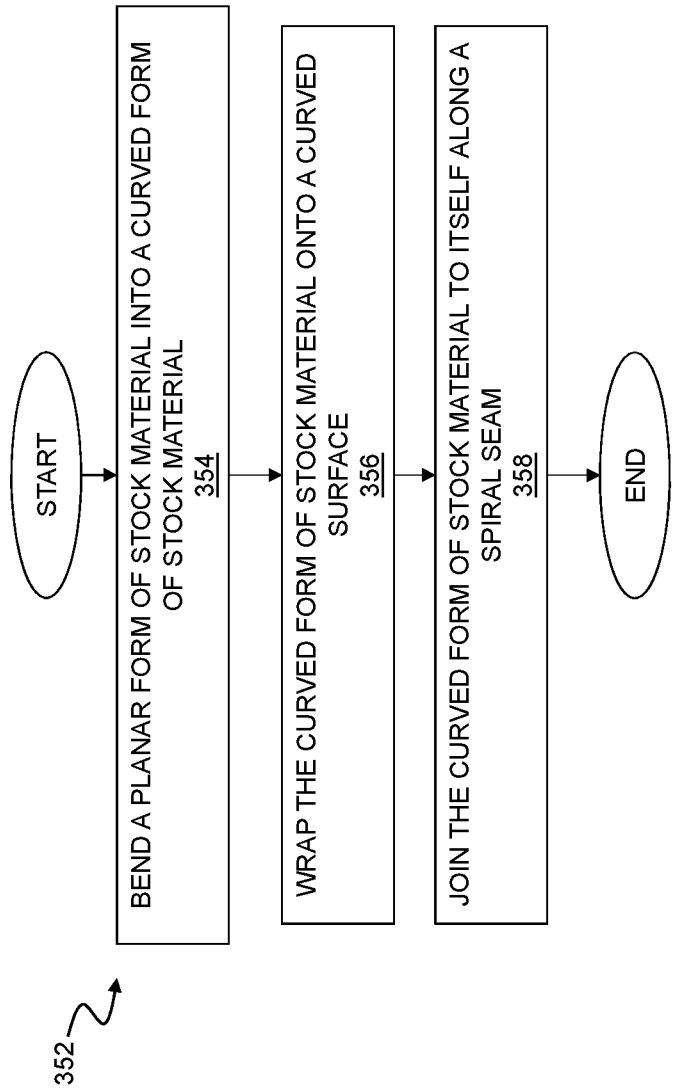
FIG. 3 is a flow chart of an exemplary method of forming a tubular structure.

FIG. 3 is a flowchart of an exemplary method 352 of forming a tubular structure. Unless otherwise specified or made clear from the context, any one or more aspects of the exemplary method 352 may be implemented as computer-readable instructions stored on the storage medium 250 (FIG. 2A) and executable by the processing unit 249 (FIG. 2A) of the control system 248 (FIG. 2A) to operate the system 230 (FIG. 2A) to form the tubular structure 104 described with respect to FIGS. 1A-1D. In certain implementations, the exemplary method 352 may include certain preparatory steps that may include coupling a plurality of sheets to one another in a nonlinear end-to-end engagement with one another to produce a planar form of the stock material having straight, longitudinal edges, while being wrappable to form a spiral seam. Further, or instead, the exemplary method 352 may include securing the stock material to a curved surface of the base or to a preceding layer, as the case may be, at the start of the process of wrapping a given layer. For the sake of clear and efficient explanation, these preparatory steps are described in detail below with respect to the discussion of FIG. 5, given that such steps are more easily understood with respect to the illustration of the hardware in FIGS. 4A and 4B used to carry out the method represented in FIG. 5. However, unless otherwise indicated or made clear from the context, any one or more of the preparatory steps described below with respect to FIG. 5 shall be understood to be includable in the exemplary method 352 without departing from the scope of the present disclosure.

As shown in step 354, the exemplary method 352 may include bending a portion of a planar form of a strip of a stock material into a curved form of the stock material. Such bending may be carried out, for example, by moving the planar form of the stock material to and through a curving device, such as the curving device 234 (FIGS. 2A and 2B). Through such bending, the stock material may approximate a curvature of the curved surface onto which the stock material may be guided. For example, in instances in which the tubular structure being formed is frustoconical, the planar form of the strip of stock material may be curved to progressively changing diameters in accordance with corresponding changes in diameter of the frustoconical shape of the tubular structure being formed. In this context, it shall be appreciated that, while a plurality of layers wrapped on a frustoconical base may deviate from a geometric frustocone, the resulting shape of the tubular structure with these features is nevertheless referred to herein as a frustocone.

As shown in step 356, the exemplary method 352 may include wrapping the curved form of the stock material onto a curved surface of a base (e.g., the base 106 in FIGS. 1B and 1C) to form a spiral seam about a longitudinal axis defined by the base. The base may be formed separately (e.g., via can-rolling or spiral welding processes) and, further or instead, may be a single layer of material (e.g., having a constant thickness) having a tubular shape. In general, wrapping the curved form of the stock material onto the curved surface of the base may include any manner and form of physical positioning of the curved form of the stock material to fit the stock material onto the curved surface while also positioning the stock material in abutment with itself (e.g., two longitudinal edges) to form a spiral seam extending about the longitudinal axis of the base. Thus, for example, wrapping the curved form of the stock material onto the curved surface may include moving the curved form of the stock material using any one or more of the various different guidance systems described herein. Further, or instead, wrapping the curved form of the stock material onto the curved surface may include pressing the stock material onto the curved surface via pressure exerted by one or more pressure rolls described herein.

As shown in step 358, the exemplary method 300 may include joining the curved form of the stock material at least to itself along the spiral seam. Further, or instead, the stock material may be joined to the curved surface of the base along the spiral seam. Unless otherwise specified or made clear from the context, joining the curved form of the stock material to itself along the spiral seam may include any one or more of various different welding techniques described herein. As a specific example, joining the curved form of the stock material to itself may include welding the curved form of the stock material to itself and to the curved surface of the base along the spiral seam. In certain instances, the weld process may include inspection, such as visual, ultrasonic, magnetic particle, or other techniques, performed manually or automatically, after one layer has been applied and before a next layer is applied to cover or otherwise obscure inspection of the weld. Additionally, or alternatively, a cap of the weld may be removed (e.g., by grinding away the cap material until the weld is flush with the surface of the layer being welded) using any one or more of various different manual and/or automated techniques before the next layer is applied. For example, weld cap removal may be carried out in-line with the weld and, further or instead, may be performed continuously as the tubular structure is formed, reducing the time and cost required for weld cap removal. As compared to instances in which the weld cap is not removed, removing the weld cap may facilitate conforming subsequent layers more tightly to the base or to a previous layer, as the case may be.

While steps of the exemplary method 352 have been described with respect to securing a first layer of a wrap onto a base, it shall be appreciated that any one or more of the various different steps of the exemplary method 352 may be repeated as necessary for adding additional layers of a wrap to the base. It shall be appreciated, however, that with repetition of steps for placement of layers after the first layer, each subsequent layer is wrapped upon a preceding layer in the stack of layers and each layer may form a different spiral seam than the spiral seam formed by the preceding layer.

Having described certain systems and methods for forming the tubular structure 104 (FIGS. 1A-1D) based on pre-curving layers of a wrap prior to positioning such layers on a base and methods of operating such a system, attention is now directed to the description of systems and methods of forming the tubular structure 104 (FIGS. 1A-1D) using tension to fit a curved form of stock material onto a curved surface.

Figure 4A:
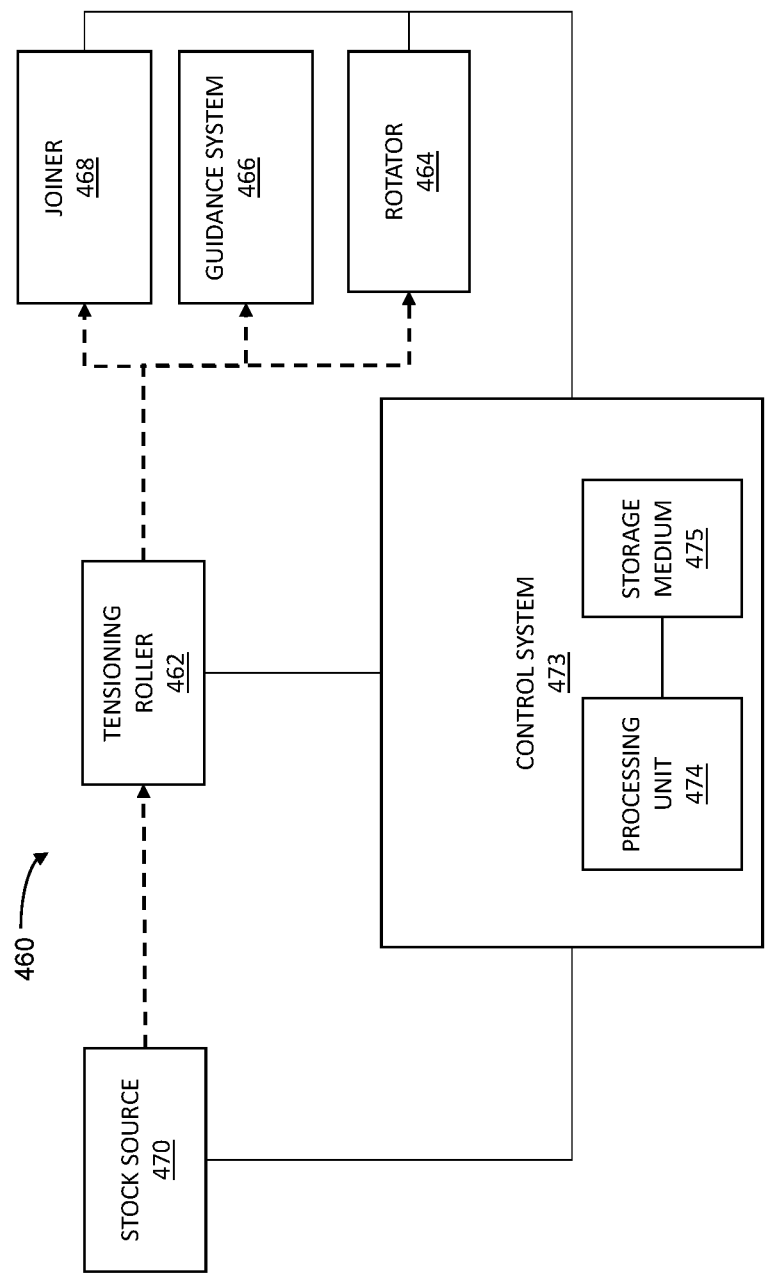
FIG. 4A is a block diagram of a fabrication system for forming a tubular structure.
Figure 4B:
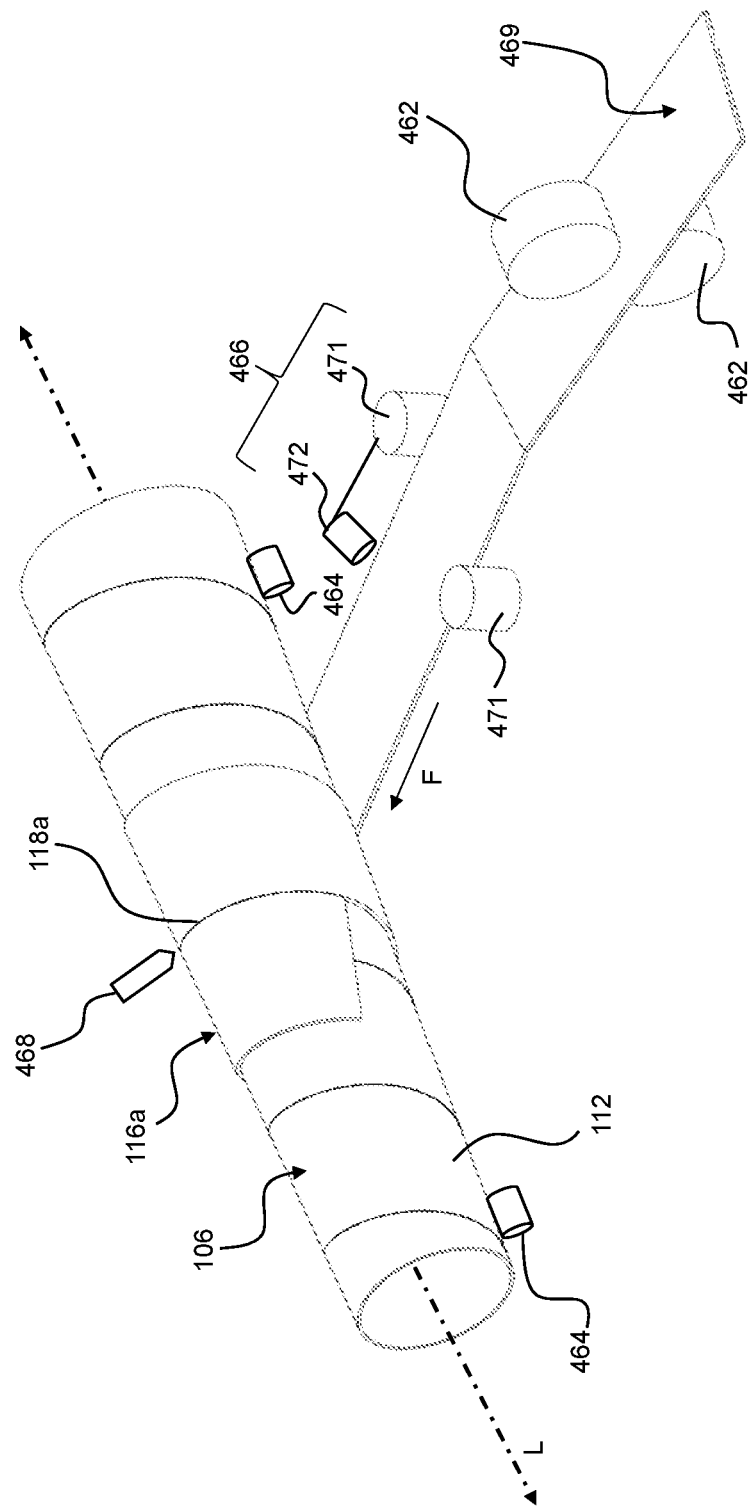
FIG. 4B is a schematic representation of a wrapping process carried out by the fabrication system of FIG. 4A.

Referring now to FIGS. 4A and 4B, a system 460 may include one or more instances of a tensioning rollers 462, a rotator 464, a guidance system 466, and a joiner 468. Each instance of the tensioning roller 462 may be positionable in contact with a planar form of a stock material 469 as the planar form of the stock material 469 is moved in the feed direction "F" to impart tension to the planar form of the stock material 469. The rotator 464 may be actuatable to rotate a curved surface, such as the second surface 112, of the base 106 about the longitudinal axis "L." The stock material 469 may be directly or indirectly attached to the curved surface of the base 106 such that, as the rotator 464 rotates the curved surface of the base 106 in a direction away from the one or more instances of the tensioning roller 462, the rotation of the base 106 may pull the planar form of the stock material 469 from a stock source 470 toward the base 106 in a feed direction "F." As the curved surface of the base 106 continues to rotate, the planar form of the stock material 469 may be pulled onto the curved surface of the base 106 to bend the stock material 469 along a first spiral seam 118a to form the first layer 116a.

Accurate positioning of the stock material 469 along the first spiral seam 118 for formation of the first layer 116a (and for positioning along spiral seams associated with subsequent layers) may be advantageously achieved through a combination of a shape of the planar form of the stock material 469 and operation of the guidance system 466. That is, the planar form of the stock material 469 from the stock source 470 may include a plurality of sheets in a non-linear end-to-end engagement with one another according to any one or more of various different techniques. In particular, unless otherwise specified or made clear from the context, the planar form of the stock material 469 and any other stock material described herein (e.g., the stock material 239 in FIG. 2B) may include a plurality of sheets in a non-linear end-to-end-engagement with another according to the techniques for arranging straight-edged sheets of material relative to one another to form a spiral seam, as described in in U.S. Pat. No. 9,302,303, entitled "TAPERED STRUCTURE CONSTRUCTION," issued to Smith et al. on Apr. 5, 2016, the entire contents of which are hereby incorporated herein by reference. Further, between the one or more instances of the tensioning roller 462 and the base 106, the guidance system 466 may make adjustments to the position of the stock material 469 such that the stock material 469 winds along the first spiral seam 118a.

Following rotation of the curved surface of the base 106 to form the first layer 116a it shall be appreciated that analogous rotation of the curved surface of the base 106 about the longitudinal axis "L" may form a subsequent layer by pulling the planar form of the stock material 469 onto the first layer 116a. This process may be repeated as necessary to form a wrap including a predetermined number and position of layers to achieve a thickness profile according to design specifications. Among other things, the resulting tight fit from pulling the planar form of the stock material 469 onto a curved surface of the base 106 or onto a preceding layer of material may be useful for increasing structural quality in the tubular structure being formed.

In general, the one or more instances of the tensioning roller 462 may be actuatable to move perpendicular to the major surfaces of the planar form of the stock material 469 to increase or decrease tension in the planar form of the stock material 469, as may be useful for controlling positioning of the stock material 469 along a spiral seam. Additionally, or alternatively, tension in the planar form of the stock material 469 moving in the feed direction "F" may be adjusted by controlling resistance of the rotation of the tensioning roller 462. The one or more instances of the tensioning roller 462 may define a gap through which the planar form of the stock material 469 may pass, and the position of the one or more instances of the tensioning roller 462 may be controllable to move the gap in a direction perpendicular to the feed direction "F." Additionally, or alternatively, each instance of the tensioning roller 462 may be rotatable at least about an axis transverse to the feed direction "F."

The rotator 464 may include, for example, one or more rollers drivable to rotate the base 106 about the longitudinal axis "L" at a controlled speed. Further, or instead, at least a portion of the rotator 464 may support the base 106 as the base 106 rotates to wrap the stock material 469 along a spiral seam. For example, the rotator 464 may at least support each end of the base 106.

The guidance system 466 may include an actuator 471 controllable to wind the planar form of the stock material 469 along a spiral seam extending about the longitudinal axis "L" of the base 106. The actuator 471 may, for example, control a position of the planar form of the stock material 469 in a direction transverse to the feed direction "F," as may be useful for achieving fine adjustments of the stock material 469 to position longitudinal edges of the stock material 469 adjacent to one another to form the spiral seam as the stock material 469 is wound onto the base 106 through rotation of the base 106. The actuator 471 may include, for example, one or more edge guides, one or more edge rollers, one or more pinch rolls, or a combination thereof.

Additionally, or alternatively, the guidance system 466 may include a sensor 472 operable to sense a parameter indicative of a position of the planar form of the stock material 469. The actuator 471 may be adjustable based on a signal from the sensor 472 to adjust a position of the planar form of the stock material 469 as the tubular structure is being formed. For example, the sensor 472 may sense a position of the planar form of the stock material 469 at a point just before the stock material 469 is wound along a spiral seam. Additionally, or alternatively, the sensor 472 may sense a position of the stock material 469 (e.g., longitudinal edges of the stock material 469) along the spiral seam being formed by the stock material 469. The sensor 472 may include, for example, an optical sensor, a camera as part of a machine vision system, a contact sensor, or a combination thereof.

In general, the joiner 468 may mechanically couple the stock material 469 to itself and/or to the base 106 according to any one or more of various different techniques described herein. Thus, the joiner 468 may include a welder operable to form any one or more of the various different welds described herein. For example, with respect to securing the stock material 469 to the base 106, the joiner 468 may form the weld 120*b* (FIG. 1D). It shall be appreciated that the joiner 468 may similarly form other welds associated with the addition of subsequent layers as necessary to form a wrap on the base 106 to achieve a tubular structure having a predetermined strength profile.

While one or more aspects of operation of the system 460 may be carried out through manual operation by an operator, the system 460 may include a control system 473 to facilitate accurate and repeatable control of certain aspects of operation of the system 460 in some implementations. The control system 473 may include, for example, a processing unit 474 and a storage medium 475 in communication with the processing unit 474. The processing unit 474 may include one or more processors, and the storage medium 475 may include a non-transitory, computer-readable storage medium. The storage medium 475 may store computer-executable instructions that, when executed by the processing unit 474, cause the system 460 to perform one or more of the various different aspects of fabrication of a tubular structure using the system 460. Optionally, the control system 473 may include an input device (e.g., a keyboard, a mouse, and/or a graphical user interface) in communication with the processing unit 474 and the storage medium 475 such that the processing unit 474 is additionally, or alternatively, responsive to input received through the input device as the processing unit 474 executes one or more of the fabrication methods described herein.

FIG. 5 is a flowchart of an exemplary method 576 of forming a tubular structure. Unless otherwise specified or made clear from the context, any one or more aspects of the exemplary method 576 may be implemented as computer-readable instructions stored on the storage medium 475 (FIG. 4A) and executable by the processing unit 474 (FIG. 4A) of the control system 473 (FIG. 4A) to operate the system 460 (FIG. 2A) to form the tubular structure 104 described with respect to FIGS. 1A-1D.

As shown in step 577, the exemplary method 576 may include coupling (e.g., welding) a plurality of sheets (e.g., metal sheets in the shape of trapezoids) in end-to-end engagement with one another produce a planar form of the stock material. In this context, end-to-end coupling shall be understood to include coupling together a short edge of one sheet to a short edge of another sheet to form a seam transverse to parallel long edges of each sheet. Such coupling may include, for example, welding sheets together according to any one or more of the various different welding techniques described herein. As indicated above, the nonlinear end-to-end engagement of the plurality of sheets may include an orientation in which with straight edges (e.g., parallel straight edges) may be curved to form spiral seams. In certain implementations, the plurality of sheets may be coupled in a nonlinear end-to-end engagement with one another such that the longitudinal edges of each sheet are transvers to the longitudinal edges of at least one other sheet. Further, or instead, the plurality of sheets may be coupled in a linear end-to-end engagement with one another such that the longitudinal edges of each sheet are colinear to the longitudinal edges of each of the other sheets. Further, or instead, in instances in which the tubular structure being formed is a right-circular cylinder, a single sheet may be used as the planar form of the stock material.

As shown in step 578, the exemplary method 576 may include securing the stock material to a curved surface of a base defining a longitudinal axis. It may be generally desirable to use one or more techniques for permanently securing the stock material to the curved surface to reduce the likelihood of unintended decoupling of the stock material from the curved surface as tension is imparted to the stock material. For example, the stock material may be secured to the curved surface of the base using one or more welding techniques described herein.

As shown in step 579, the exemplary method 576 may include rotating the curved surface of the base about the longitudinal axis of the base. With the stock material secured to the base (e.g., directly or indirectly secured to the curved surface of the base), it shall be appreciated that rotation of the curved surface of the base may curve the planar form of the stock material about the curved surface of the base. That is, the stock material may be curved about the curved surface of the base such that the stock material and the base collectively form at least a portion of the tubular structure being formed. In the case of a first layer, the planar form of the stock material curving about the curved surface of the base may fit the stock material directly onto the curved surface of the base. Additionally, or alternatively, for subsequent layers, the planar form of the stock material curving about the curved surface of the base may fit the stock material directly onto a preceding layer of stock material secured to the base. In certain implementations, by controlling a position of the stock material as the stock material is curved about the curved surface of the base, a first longitudinal edge and a second longitudinal edge of the stock material may form a spiral seam about the longitudinal axis of the base such that the stock material and the base collectively form at least a portion of the tubular structure being formed.

As shown in step 580, the exemplary method 576 may include, with the stock material secured to the base, moving the planar from of the stock material through one or more tensioning rollers as the curved surface of the base rotates about the longitudinal axis. The one or more tensioning rollers may be adjustable, for example, to adjust an amount of tension in the planar form of the stock material to facilitate achieving a tight fit of the stock material moving onto the curved surface of the base.

As shown in step 581, the exemplary method 576 may include joining the stock material to itself along the at least one spiral seam. For example, joining the stock material to itself at least along the at least one spiral seam may include welding the stock material to itself to form a weld coextensive with the spiral seam. Additionally, or alternatively, joining the stock material to itself along the at least one spiral seam may include joining the stock material to the curved surface of the base, to a preceding layer of the stock material, or a combination thereof.

In general, unless otherwise specified or made clear from the context, it shall be appreciated that any one or more of the various different steps of the exemplary method 576 may be repeated as necessary to wrap a plurality of layers onto one another in any number and orientation of layers useful for forming a tubular structure having a predetermined strength profile.

While certain implementations have been described, other implementations are additionally or alternatively possible.

For example, while a planar form of a stock material has been described as being wound onto a base to form a tubular structure, it shall be appreciated that the planar form of stock material may be additionally, or alternatively, wrapped onto a reusable mandrel, rather than a base forming a portion of the final tubular structure. Continuing with this example, the process of adding material may be repeated, using the first layer (formed on the mandrel) as a base, until a tubular structure is formed with a wrap including a number and position of layers, as necessary to achieve a predetermined strength profile of the tubular structure.

As another example, reinforced tubular structures have been described as including a base and one or more layers wrapped about the base to impart increased thickness—and therefore strength—to the base, other approaches to reinforcing tubular structures are additionally or alternatively possible. For example, as described in examples that follow, a tubular structure may include a stabilizer disposed between a plurality of shells to impart overall strength to the tubular structure.

Figure 6B:
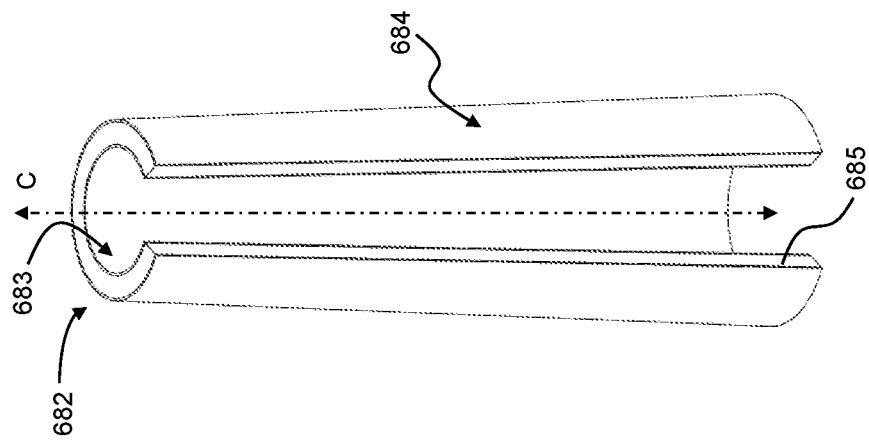
FIG. 6B is a perspective view of the tubular structure of FIG. 6A, shown with a section of the tubular structure removed.
Figure 6A:
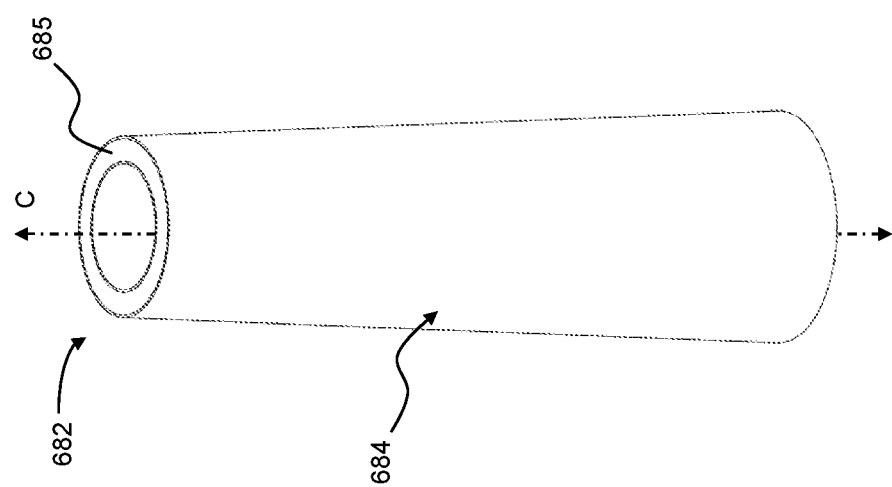
FIG. 6A is a perspective view of a tubular structure a first shell, a second shell, and a filler therebetween.

Referring now to FIGS. 6A and 6B, a tubular structure 682 may include a first shell 683, a second shell 684, and a filler material 685. The second shell 684 may have a frustoconical shape, and the first shell 683 may be nested within the second shell 684 such that the first shell 683 and the second shell 684 define a gap therebetween. The filler material 685 may be disposed in the gap defined between the first shell 683 and the second shell 684. For example, the filler material 685 may fill the gap, as may be useful for achieving uniform strength characteristics in the tubular structure 682. In particular, the filler material 685 may facilitate transferring stresses (e.g., shear stress) between the first shell 683 and the second shell 684. Additionally, or alternatively, the filler material 685 disposed in the gap defined by the first shell 683 and the second shell 684 may reduce the likelihood of buckling of the first shell 683 and the second shell 684 under a given load, as compared to the likelihood of buckling the first shell 683 and the second shell 684, under the same load, without the filler material 685 between the first shell 683 and the second shell 684. That is, the tubular structure 682 may achieve strength and stiffness comparable to strength and stiffness of a tubular structure formed with thick, solid metal walls. However, because the first shell 683 and the second shell 684 may have thin metal walls compared to the tubular structure formed with thick, solid metal walls, the strength performance of the tubular structure 682 may be generally achievable at significantly less cost and with significantly faster production time, as compared to forming the tubular structure that achieves the same strength performance using thick, solid metal walls.

In general, one or both of the first shell 683 or the second shell 684 may be formed using spiral formation of a strip of a stock material. In certain instances, the first shell 683 and the second shell 684 may be concentrically aligned with one another such that the gap defined between the first shell 683 and the second shell 684 is substantially symmetric about a center axis "C" defined by the first shell 683 and the second shell 684. Among other things, such symmetry may be generally useful for forming the tubular structure 682 with substantially uniform strength in a circumferential direction about the frustoconical shape of the second shell 684. In some cases, the second shell 684 may circumscribe the first shell 683 such that the gap formed by the first shell 683 and the second shell 684 is annular, with such an annulus being useful for containing the filler material 685 between the first shell 683 and the second shell 684 and away from external conditions. As a more specific example, the first shell 683 may be substantially parallel to the second shell 684 along a longitudinal axis (e.g., the center axis "C") defined by the first shell 683. That is, the first shell 683 may have a frustoconical shape parallel to the frustoconical shape of the second shell 684 such that the gap between the first shell 683 and the second shell 684 is also frustoconical. As with other frustoconical shapes described herein, a frustoconical shape of a gap between the first shell 683 and the second shell 684 may be useful for achieving strength performance using less material and, thus, ultimately at less cost.

The filler material 685 may, for example, include a material bonded to the first shell 683, the second shell 684, or a combination thereof. The filler material may include any one or more of various different types of material that may bond to metal while having desirable strength characteristics for a given end-use application. As an example, the filler material may include a material having consistent strength characteristics throughout a volume of the filler material. Some examples of materials useful in the filler material include cement, filled epoxy, grout, high density foam, sand, or combinations thereof. In some instances, the filler material may include a plurality of constituent components spatially separated from one another, with such spatial separation of constituent components useful for achieving a targeted strength profile in a longitudinal direction parallel to the center axis "C." Continuing with this example, constituent components of such a filler material may include different concrete formulations arranged in strata in a direction parallel to the center axis "C."

Figure 7C:
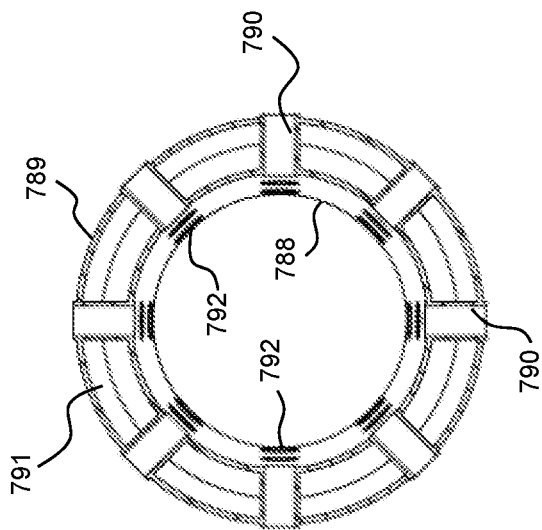
FIG. 7C is a top view of a cross-section of the tubular structure, with the cross-section taken along line 7B-7B in FIG. 7B.
Figure 7B:
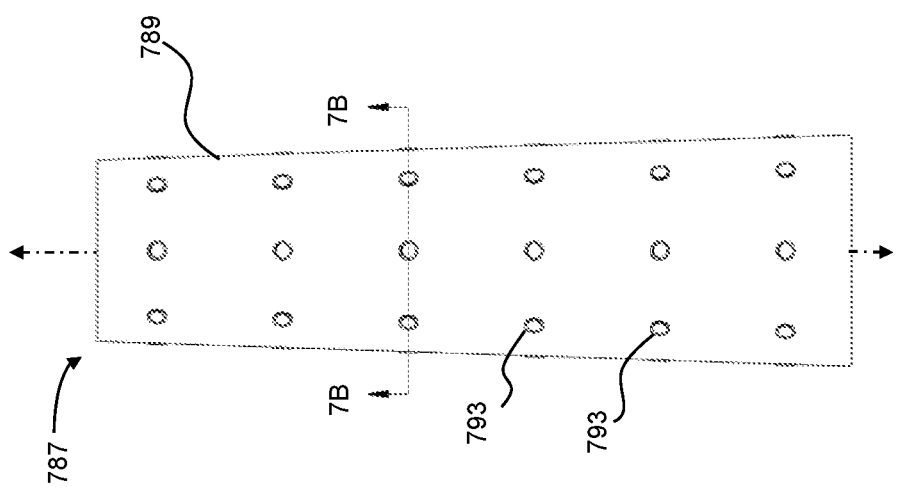
FIG. 7B is a side view of the tubular structure of FIG. 7A.
Figure 7A:
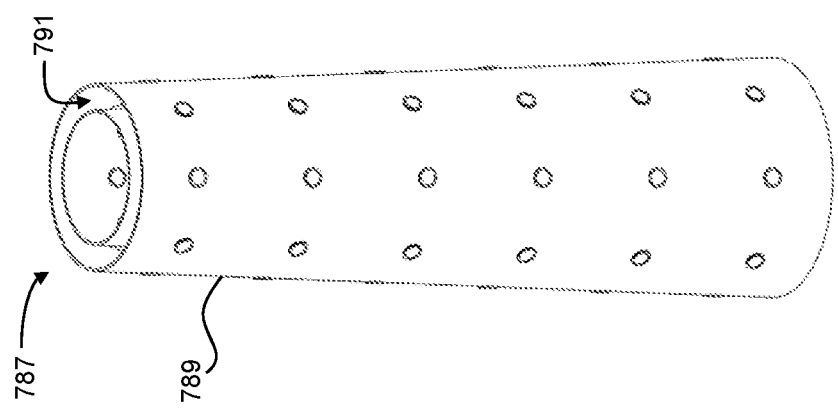
FIG. 7A is a perspective view of a tubular structure including a first shell, a second shell, and a plurality of structural elements extending therebetween.

Referring now to FIGS. 7A-7C, a tubular structure 787 may include a first shell 788, a second shell 789, and a plurality of structural elements 790 (e.g., steel rods, ribs, tubes, or a combination thereof). Unless otherwise specified or made clear from the context, the first shell 788 and the second shell 789 may be arranged relative to one another in a manner analogous to any one or more of the arrangements of the first shell 683 and the second shell 684 described above with respect to FIGS. 6A-6B. Thus, for example, the second shell 789 may have a frustoconical shape, and the first shell 788 may be nested in the second shell 789 such that a gap 791 is defined between the first shell 788 and the second shell 789. The plurality of structural elements 790 may be coupled to each of the first shell 788 and the second shell 789 and extend through the gap 791. Through such coupling, each one of the plurality of structural elements 790 may facilitate transferring shear loading and/or reducing the likelihood of buckling of each shell. More specifically, with the plurality of structural elements 790 coupling the first shell 788 and the second shell 789, the tubular structure 787 may achieve structural performance similar to structural performance of tubular structures formed with thick, solid metal walls. Thus, as with other examples describe herein, the tubular structure 787 may facilitate achieving structural performance comparable to tubular structures formed with thick, solid metal walls, while being significantly less expensive to produce.

In certain instances, the first shell 788 may define a plurality of first holes 792 and the second shell 789 may define a plurality of second holes 793 aligned with the plurality of first holes 792. Continuing with this example, each one of the plurality of structural elements 790 may extend through one of the plurality of first holes 792 and a corresponding one of the plurality of the second holes 793, as may be useful for installing and/or replacing the structural elements 790 in the gap 791 without requiring access to the gap 791. For example, each one of the plurality of structural elements 790 may be passed through the plurality of first holes 792 to the plurality of second holes 793 to couple the first shell 788 and the second shell 789 to one another. Additionally, or alternatively, each one of the plurality of structural elements 790 may be welded or otherwise joined to each of the first shell 788 and the second shell 789 to stiffen the tubular structure 787, as compared to the stiffness of the first shell 788 and the second shell 789 alone.

While certain implementations of reinforced tubular structures have been described as including stabilizers disposed between shells, it shall be appreciated that stabilizers may additionally or alternatively be disposed along an outer surface of a shell to form a tubular structure with structural performance comparable to structural performance of tubular structures formed of thick, solid metal walls, while being less expensive and faster to produce than such tubular structures formed of thick, solid metal walls.

Figure 8C:
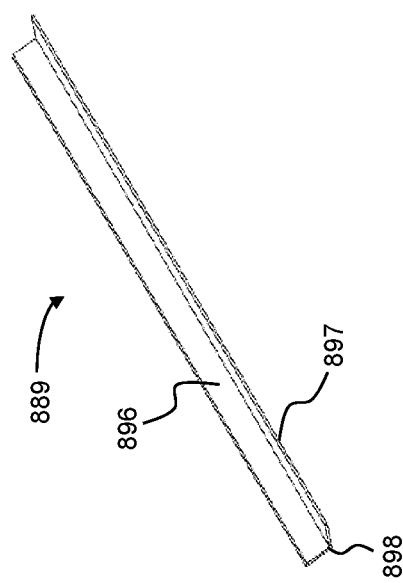
FIG. 8C is a perspective view of an elongate rib of the tubular structure of FIG. 8A.
Figure 8B:
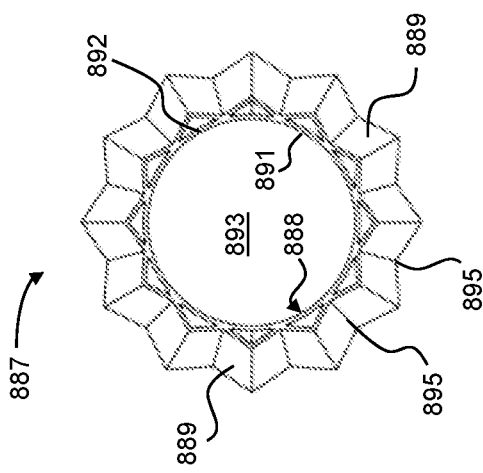
FIG. 8B is a top view of the tubular structure of FIG. 8A.
Figure 8A:
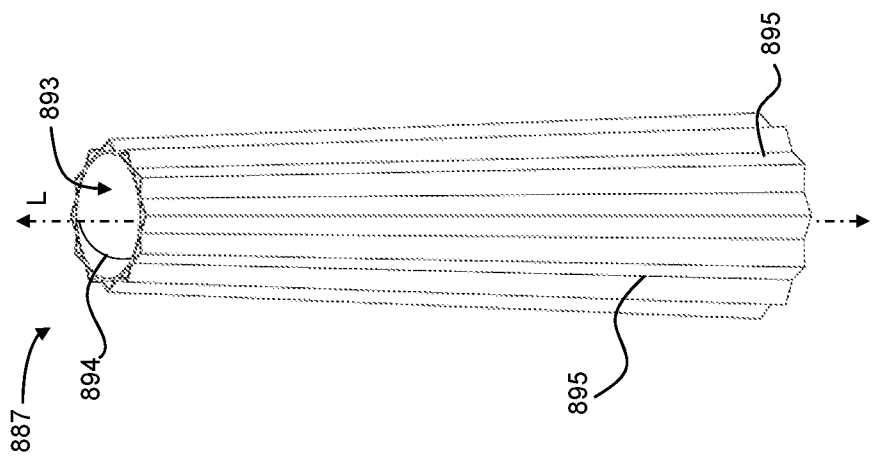
FIG. 8A is a perspective view of a tubular structure including a shell and a plurality of elongate ribs coupled to the shell.

For example, referring now to FIGS. 8A-8c, a tubular structure 880 may include a shell 888 and a plurality of elongate ribs 889. The shell 888 may have a first surface 891 and a second surface 892 opposite one another, and the first surface 891 may define a cavity 893. The shell 888 may have a tubular shape (e.g., a frustoconical shape) defining a longitudinal axis "L." The shell 888 may have a spiral seam 894 extending about the longitudinal axis "L," and each one of the plurality of elongate ribs 889 may be coupled to the shell 888 (e.g., along one or both of the first surface 891 or the second surface 892) with a longitudinal dimension of each elongate rib 889 substantially coplanar with the longitudinal axis "L" such that the longitudinal dimension of each one of the elongate ribs 889 extends across the spiral seam 894 of the shell 888 to provide structural support across the spiral seam 894. In certain implementations, each one of the elongate ribs 889 may be notched to facilitate passing the spiral seam 894 of the shell 888 underneath the plurality of elongate ribs 889 with reduced likelihood of interfering with the tight fit between each one of the plurality of elongate ribs 889 and the shell 888.

The plurality of elongate ribs 889 may be spaced relative to one another along the shell 888 according to any spacing as may be useful for achieving a target structural performance. For example, the plurality of elongate ribs 889 may be coupled to one another along a plurality of longitudinal seams 895 substantially coplanar with the longitudinal axis "L" defined by the tubular shape of the shell. As a more specific example, the plurality of elongate ribs 889 may be coupled to one another to circumscribe the shell 888, as may be useful for achieving substantially uniform strength about a circumference of the shell 888. While any one or more of various different techniques may be used to couple the plurality of elongate ribs 889 to the shell 888, the longitudinal seams 895 may be formed by welding the plurality of elongate ribs 889 to the shell 888 using a full or skip weld in some implementations.

In certain implementations, each one of the elongate ribs 889 may be V-shaped with a first leg 896 and a second leg 897 coupled to one another at an apex 898, and the first leg 896 and the second leg 897 coupled to the shell 888 such that the apex 898 points in a radial direction away from the shell 888. Continuing with this example, the elongate ribs 889 may be formed into the V shape using a press brake. Additionally, or alternatively, the elongate ribs 889 may be roll formed, or formed of pairs of flat strips of material joined (e.g., welded) together at the apex 898.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention, which is to be interpreted in the broadest sense allowable by law.

What is claimed is:

1. A tubular structure comprising:
a base having a first surface and a second surface opposite one another, the first surface defining an elongate cavity, and the base having a tubular shape defining a longitudinal axis extending along the elongate cavity; and
a wrap supported on the second surface of the base, the wrap including a plurality of layers, and each layer having a first longitudinal edge and a second longitudinal edge coupled to one another along a respective spiral seam associated with the given layer and extending about the longitudinal axis of the base, wherein the base and each one of the plurality of layers are metal, a first layer of the plurality of layers is joined to the base via a first weld penetrating into the base, and a collective thickness of the wrap and the base varies in a direction parallel to the longitudinal axis of the base.

2. The tubular structure of claim 1, wherein a thickness of the wrap varies in a direction parallel to the longitudinal axis of the base.

3. The tubular structure of claim 2, wherein a thickness of the base is substantially constant in a direction parallel to the longitudinal axis of the base.

4. The tubular structure of claim 2, wherein the thickness of the wrap varies monotonically in a direction parallel to the longitudinal axis of the base.

5. The tubular structure of claim 4, wherein the tubular shape of the base includes a frustocone tapered in a direction parallel to the longitudinal axis and the thickness of the wrap decreases monotonically in a direction of a taper of the frustocone.

6. The tubular structure of claim 1, wherein the plurality of layers are at least partially stacked on one another in a radial direction.

7. The tubular structure of claim 6, wherein each layer of the plurality of layers circumscribes the base at least once.

8. The tubular structure of claim 6, wherein a number of layers of the plurality of layers varies in a direction parallel to the longitudinal axis of the base.

9. The tubular structure of claim 6, wherein the respective spiral seam of a given layer is longitudinally offset from the respective spiral seam of each layer adjacent to the given layer.

10. The tubular structure of claim 1, wherein the base includes a seam extending about the longitudinal axis of the base.

11. The tubular structure of claim 10, wherein the respective spiral seam of the first layer of the wrap is longitudinally spaced from the seam of the base along the longitudinal axis.

12. The tubular structure of claim 10, wherein the seam of the base is parallel to the respective spiral seam of the first layer of the wrap.

13. The tubular structure of claim 1, wherein the plurality of layers includes a second layer, and the first layer is joined to the second layer via a second weld penetrating the first layer.

14. A tubular structure comprising:
a base having a first surface and a second surface opposite one another, the first surface defining an elongate cavity, and the base having a tubular shape defining a longitudinal axis extending along the elongate cavity; and
a wrap supported on the second surface of the base, the wrap including a plurality of layers, and each layer having a first longitudinal edge and a second longitudinal edge coupled to one another along a respective spiral seam associated with the given layer and extending about the longitudinal axis of the base, wherein the base and each one of the plurality of layers are metal, a first layer of the plurality of layers is joined to the base via a first weld penetrating into the base, and the respective first longitudinal edge and the respective second longitudinal edge of each one of the plurality of layers forms a V shape, and the respective first longitudinal edge and the respective second longitudinal edge of each one of the plurality of layers are welded to one another along the given V shape defined therebetween.

* * * * *